US010861182B2

(12) United States Patent
Sekii

(10) Patent No.: US 10,861,182 B2
(45) Date of Patent: Dec. 8, 2020

(54) IMAGE RECOGNITION DEVICE, IMAGE RECOGNITION METHOD, AND COMPUTER-READABLE RECORDING MEDIUM HAVING IMAGE RECOGNITION PROGRAM RECORDED THEREON

(71) Applicant: KONICA MINOLTA, INC., Tokyo (JP)

(72) Inventor: Taiki Sekii, Takatsuki (JP)

(73) Assignee: KONICA MINOLTA, INC., Tokyo (JP)

( * ) Notice: Subject to any disclaimer, the term of this patent is extended or adjusted under 35 U.S.C. 154(b) by 183 days.

(21) Appl. No.: 16/211,772

(22) Filed: Dec. 6, 2018

(65) Prior Publication Data

US 2019/0236801 A1 Aug. 1, 2019

(30) Foreign Application Priority Data

Jan. 30, 2018 (JP) ................................. 2018-013933

(51) Int. Cl.
*G06T 7/70* (2017.01)
*G06T 7/77* (2017.01)
*G06K 9/00* (2006.01)

(52) U.S. Cl.
CPC .................. *G06T 7/70* (2017.01); *G06K 9/00* (2013.01); *G06T 7/77* (2017.01); *G06T 2207/30196* (2013.01); *G06T 2207/30201* (2013.01)

(58) Field of Classification Search
CPC .............................. G06K 9/00389; G06T 7/70
USPC ........ 382/103, 199, 309, 254, 218; 386/241; 375/240.21
See application file for complete search history.

(56) References Cited

U.S. PATENT DOCUMENTS

| 2011/0262045 A1* | 10/2011 | Ichikawa ............... G03B 15/00 382/218 |
| 2013/0243259 A1* | 9/2013 | Kawaguchi .......... G06K 9/3241 382/103 |
| 2014/0363047 A1* | 12/2014 | Han ..................... G06K 9/6259 382/103 |
| 2018/0068461 A1* | 3/2018 | Shiozaki ................... G06T 7/75 |

OTHER PUBLICATIONS

Zhe Cao et al., "Realtime Multi-Person 2D Estimation using Part Affinity Fields," pp. 1-9, Apr. 14, 2017.

* cited by examiner

*Primary Examiner* — Kiet M Doan
(74) *Attorney, Agent, or Firm* — Cantor Colburn LLP

(57) ABSTRACT

Image recognition device that combines first part candidates and second part candidates to generate a plurality of pairs; that calculates first estimate value for each of the plurality of pairs, this value indicating estimated possibility that these candidates are connected; that executes, for each of the plurality of pairs, correcting first estimate value by using second estimate value as a weight in a state in which a part candidate that is one among a pair of part candidates matching of which has already been performed and that differs from both first part candidate and second part candidate is connected to either first part candidate or second part candidate, second estimate value indicating estimated possibility that the pair of part candidates matching of which has already been performed are connected; and that performs matching of first part candidates and second part candidates using corrected first estimate values.

5 Claims, 30 Drawing Sheets

IMAGE RECOGNITION DEVICE, IMAGE RECOGNITION METHOD, AND COMPUTER-READABLE RECORDING MEDIUM HAVING IMAGE RECOGNITION PROGRAM RECORDED THEREON

CROSS REFERENCE TO RELATED APPLICATION

The present application claims priority under 35 U.S.C. § 119 to Japanese Application No. 2018-013933, filed Jan. 30, 2018, the entire content of which is incorporated herein by reference.

TECHNICAL FIELD

The present invention relates to a technique for recognizing a plurality of objects captured in an image.

BACKGROUND ART

Attempts are being made to use deep learning to estimate the posture of each of a plurality of people captured in an image. As one method of posture estimation, there is a method called the bottom-up approach (for example, see Zhe Cao, and three others, "Realtime Multi-Person 2D Pose Estimation using Part Affinity Fields", [online], p. 2, [retrieved Jan. 10, 2018], Internet <URL: https://arxiv.org/pdf/1611.08050>). In the bottom-up approach, (1) a plurality of types of joint candidates that are necessary for posture estimation (for example, neck joint candidates, left shoulder joint candidates, right shoulder joint candidates, left elbow joint candidates, right elbow joint candidates, left wrist joint candidates, right wrist joint candidates, left hip joint candidates, right hip joint candidates, left knee joint candidates, right knee joint candidates, left ankle joint candidates, and right ankle joint candidates) are detected from an image in which a plurality of people are captured, and (2) for each person, processing of connecting the plurality of types of joint candidates that have been detected and estimating the posture of the person is executed.

SUMMARY OF INVENTION

In the bottom-up approach, joint candidates of one person are not distinguished from those of another person. Accordingly, matching of joint candidates is performed, as a precondition for connecting together a plurality of types of joint candidates. For example, suppose that a left elbow joint candidate indicating the left elbow joint of a person A, a left elbow joint candidate indicating the left elbow joint of a person B, a left wrist joint candidate indicating the left wrist joint of the person A, and a left wrist joint candidate indicating the left wrist joint of the person B are detected. As a result of the matching of joint candidates being performed, the left elbow joint candidate indicating the left elbow joint of the person A and the left wrist joint candidate indicating the left wrist joint of the person A are connected, and the left elbow joint candidate indicating the left elbow joint of the person B and the left wrist joint candidate indicating the left wrist joint of B are connected.

However, detected joint candidates may contain those that are not human joints. For example, when an image includes a plurality of people and a glove for the left hand placed on a desk, one corner part of the top board of the desk may be detected as a left elbow joint candidate and the mouth part of the glove for the left hand may be detected as a left wrist joint candidate. If the left elbow joint candidate indicating the left elbow joint of the person A and the left wrist joint candidate indicating the mouth part of the glove for the left hand are unfortunately connected and the left elbow joint candidate indicating one corner part of the top board of the desk and the left wrist joint candidate indicating the left wrist joint of the person A are unfortunately connected as a result of matching of joint candidates, the accuracy of the posture estimation decreases.

Description has been provided taking the matching of joint candidates as an example. However, when the bottom-up approach is applied to recognition of faces of a plurality of people, for example, matching will be performed of eye candidates and nose candidates, nose candidates and mouth candidates, and eye candidates and ear candidates. In this description, the target with respect to which matching is performed (for example, joint candidates or face part candidates) is referred to by using the generic term "part candidate".

An aim of the present invention is to provide an image recognition device, an image recognition method, and a computer-readable recording medium having an image recognition program recorded thereon that are capable of improving matching accuracy of part candidates detected from an image in which a plurality of objects are captured.

In order to realize the above-described aim, an image recognition device reflecting one aspect of the present invention includes: a detection unit that executes, for each of a plurality of parts, processing of detecting a plurality of part candidates serving as candidates of the part from an image in which a plurality of objects having the plurality of parts are captured; a generation unit that, for a first part candidate and a second part candidate that are the one and the other of the part candidates with respect to which matching is to be performed, combines a plurality of the first part candidates and a plurality of the second part candidates to generate a plurality of pairs each including the first part candidate and the second part candidate; a first calculation unit that calculates a first estimate value for each of the plurality of pairs, the first estimate value indicating an estimated possibility that the first part candidate and the second part candidate are connected; a correction unit that executes, for each of the plurality of pairs, processing of correcting the first estimate value by using a second estimate value as a weight when a part candidate that is one among a pair of part candidates matching of which has already been performed and that differs from both the first part candidate and the second part candidate is connected to either the first part candidate or the second part candidate, the second estimate value indicating an estimated possibility that the pair of part candidates matching of which has already been performed are connected; and a matching unit that performs matching of the plurality of first part candidates and the plurality of second part candidates based on the corrected first estimate values for the respective ones of the plurality of pairs.

Advantages and features provided by one or more embodiments of the invention can be sufficiently understood from the detailed description provided below and the appended drawings. The detailed description and the appended drawings are given by way of example only and are not intended to define the limits of the present invention.

DESCRIPTION OF EMBODIMENT

Figure 1:
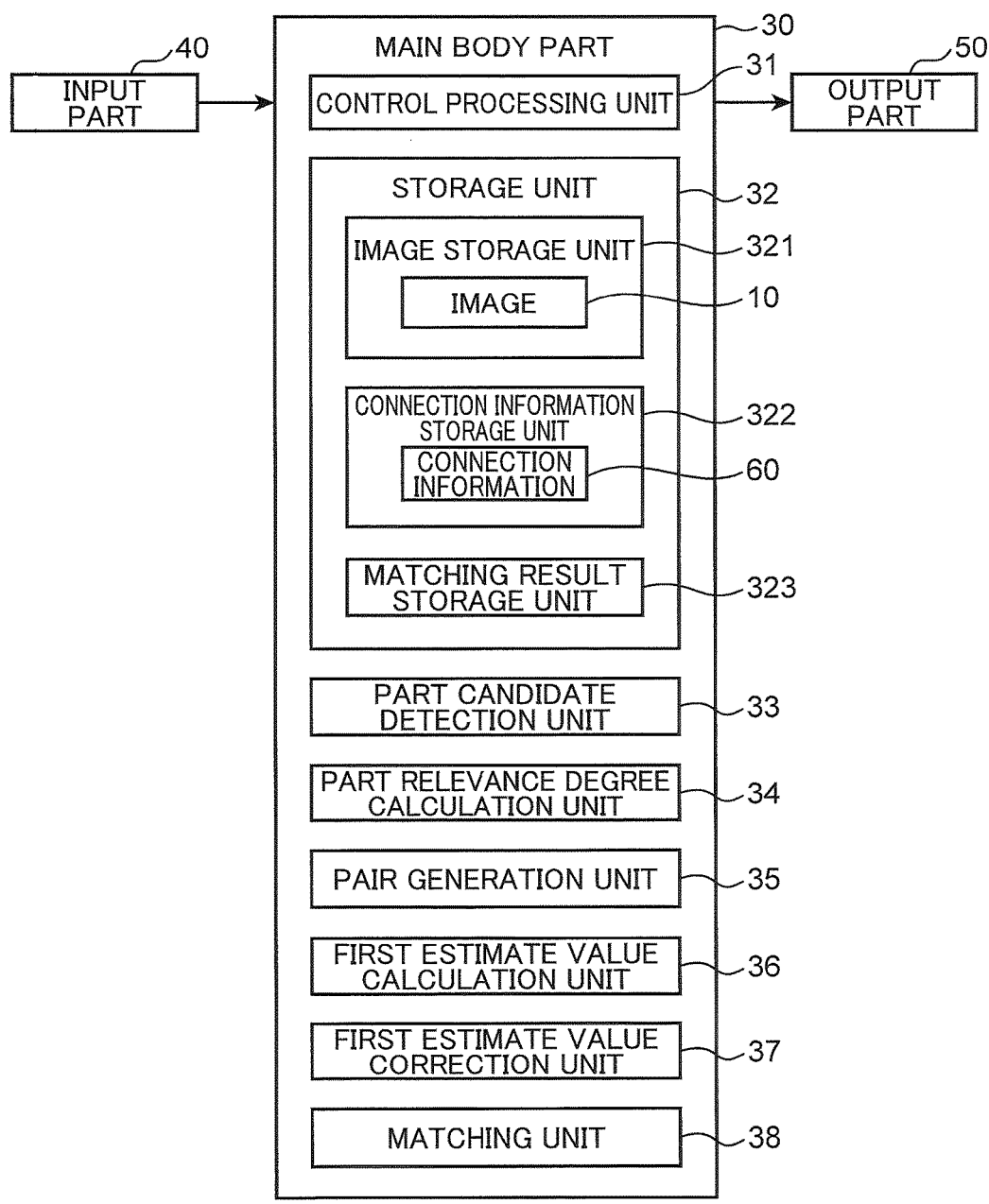
FIG. 1 is a functional block diagram of an image recognition device according to an embodiment.

In the following, description is provided of one or more embodiments of the present invention, with reference to the drawings. However, the scope of the invention is not limited to the one or more embodiments disclosed.

In the drawings, structures provided with the same symbol indicate the same structure, and regarding such a structure, description of matters already described is omitted. In the present description, reference numerals without suffixes (for example, left wrist joint candidates 4) are used when generically referring to structures, and reference numerals with suffixes (for example, left wrist joint candidate 4-1) are used when referring to an individual structure.

FIG. 1 is a functional block diagram of an image recognition device 100 according to an embodiment. The image recognition device 100 includes the following functional blocks: a main body part 30; an input part 40; and an output part 50.

The main body part 30 is a computer capable of performing deep learning. The main body part 30 uses deep learning to estimate the posture of each of a plurality of people captured in an image. In the embodiment, description is provided taking posture estimation of the left arm as an example. However, the present invention is not limited to this, and for example, posture estimation may be performed of the entire body, the upper half of the body, or the lower half of the body.

The main body part 30 includes the following functional blocks: a control processing unit 31; a storage unit 32; a part candidate detection unit 33; a part relevance degree calculation unit 34; a pair generation unit 35; a first estimate value calculation unit 36; a first estimate value correction unit 37; and a matching unit 38.

The control processing unit 31 is a device for controlling each unit of the main body part 30 (i.e., the storage unit 32, the part candidate detection unit 33, the part relevance degree calculation unit 34, the pair generation unit 35, the first estimate value calculation unit 36, the first estimate value correction unit 37, and the matching unit 38) in accordance with the function of each unit.

The storage unit 32 stores various kinds of images, data, information, etc., that are necessary for the processing and control executed by the image recognition device 100. The storage unit 32 includes the following functional blocks: an image storage unit 321; a connection information storage unit 322; and a matching result storage unit 323.

Figure 2:
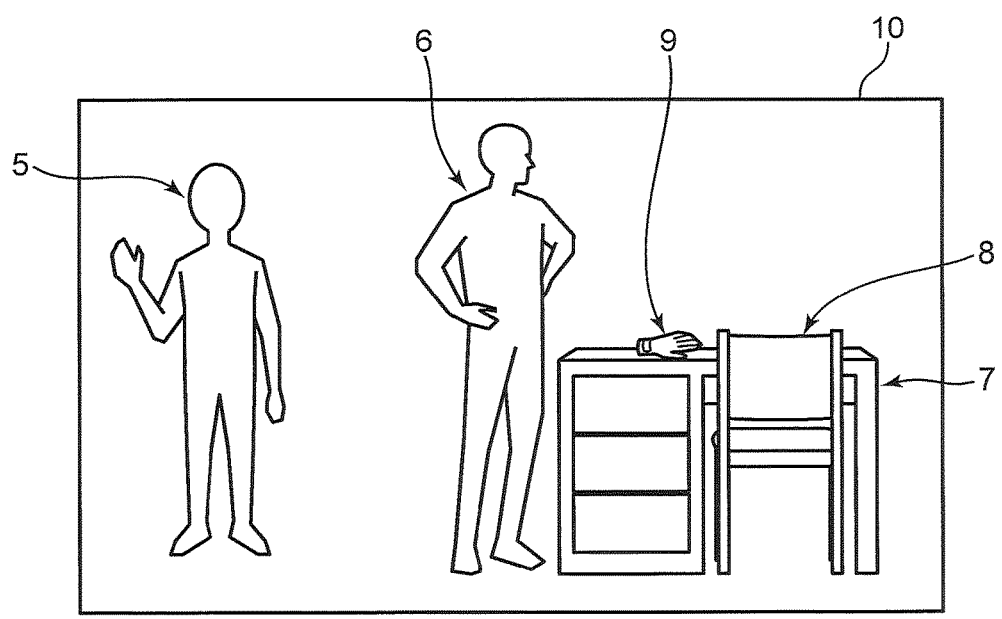
FIG. 2 is a schematic diagram of one example of an image in which a plurality of people with respect to which posture estimation of the left arm is to be performed are captured.

The image storage unit 321 stores in advance an image 10 in which a plurality of people with respect to which posture estimation of the left arm is to be performed are captured. FIG. 2 is a schematic diagram of one example of the image 10. In the image 10 illustrated in FIG. 2, a person 5, a person 6, a desk 7, a chair 8, and a glove 9 for the left hand placed on the desk 7 are captured.

The image 10 is an image in which a plurality of objects having a plurality of parts are captured. The objects are, for example, people, humanoid robots, animals, and faces. The parts are joints in the case of posture recognition and are face parts (the eyes, the nose, the mouth, and the ears) in the case of facial recognition.

Figure 3:
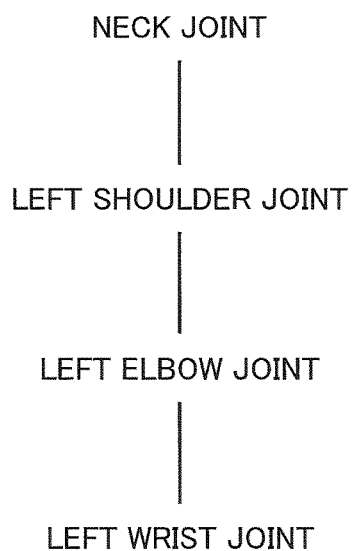
FIG. 3 is an explanatory diagram describing one example of connection information.

Referring to FIG. 1, the connection information storage unit 322 (first storage unit) stores in advance connection information 60. The connection information 60 indicates, for a plurality of joints that are necessary for posture estimation of the left arm, a connection relationship of these joints. The plurality of joints that are necessary for posture estimation of the left arm are the neck joint, the left shoulder joint, the left elbow joint, and the left wrist joint. The connection information 60 indicates that the neck joint and the left shoulder joint are connected, that the left shoulder joint and the left elbow joint are connected, and that the left elbow joint and the left wrist joint are connected. FIG. 3 is an explanatory diagram describing one example of the connection information 60. The connection information 60 illustrated in FIG. 3 is constituted of four joints (the neck joint, the left shoulder joint, the left elbow joint, and the left wrist joint) serving as nodes, an edge connecting the neck joint and the left shoulder joint, an edge connecting the left shoulder joint and the left elbow joint, and an edge connecting the left elbow joint and the left wrist joint.

Referring to FIG. 1, the matching result storage unit 323 (second storage unit) stores, for each of the plurality of people captured in the image, a result yielded by matching of pairs of joint candidates being performed. This is described in further detail later.

The part candidate detection unit 33 detection unit) uses a convolutional neural network (CNN) to extract, from the image 10, neck joint candidates serving as candidates of neck joints, left shoulder joint candidates serving as candidates of left shoulder joints, left elbow joint candidates serving as candidates of left elbow joints, and left wrist joint candidates serving as candidates of left wrist joints, and generates a synthesized image 11 (part confidence map) yielded by synthesizing these detected joint candidates (part candidates) with the image 10. The part candidate detection unit 33 generates the synthesized image 11 by using, for example, a method similar to that used in the generation of the part confidence maps disclosed in Non-Patent Literature 1.

Figure 4:
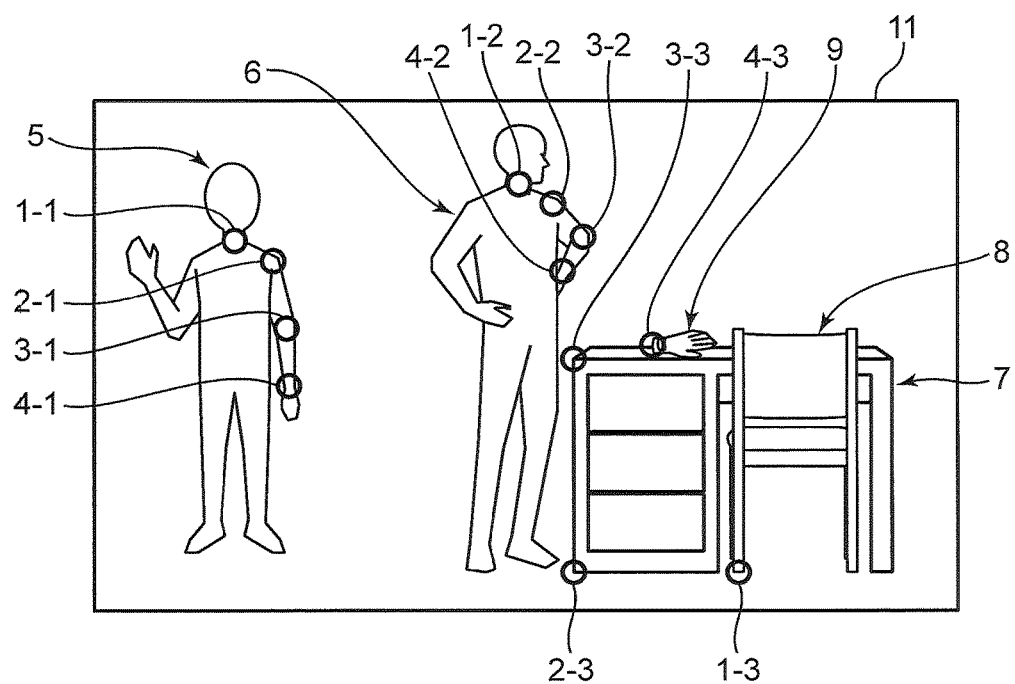
FIG. 4 is a schematic diagram illustrating one example of a synthesized image.

FIG. 4 is a schematic diagram illustrating one example of the synthesized image 11. In the synthesized image 11 illustrated in FIG. 4, the parts indicated by the respective joint candidates are as follows.

The neck joint candidate 1-1 indicates the neck joint of the person 5.

The neck joint candidate 1-2 indicates the neck joint of the person 6.

The neck joint candidate 1-3 indicates the bottom end part of one leg of the chair 8.

The left shoulder joint candidate 2-1 indicates the left shoulder joint of the person 5.

The left shoulder joint candidate 2-2 indicates the left shoulder joint of the person 6.

The left shoulder joint candidate 2-3 indicates the bottom end part of one leg of the desk 7.

The left elbow joint candidate 3-1 indicates the left elbow joint of the person 5.

The left elbow joint candidate 3-2 indicates the left elbow joint of the person 6.

The left elbow joint candidate 3-3 indicates one corner part of the top board of the desk 7.

The left wrist joint candidate 4-1 indicates the left wrist joint of the person 5.

The left wrist joint candidate 4-2 indicates the left wrist joint of the person 6.

The left wrist joint candidate 4-3 indicates the mouth part of the glove 9 for the left hand.

As described up to this point, the part candidate detection unit 33 executes, for each of a plurality of parts, processing of detecting a plurality of part candidates serving as candidates of the part from the image 10 in which a plurality of objects having the plurality of parts are captured. In the embodiment, the parts are joints, the objects are people, and the part candidates are joint candidates.

Figure 5:
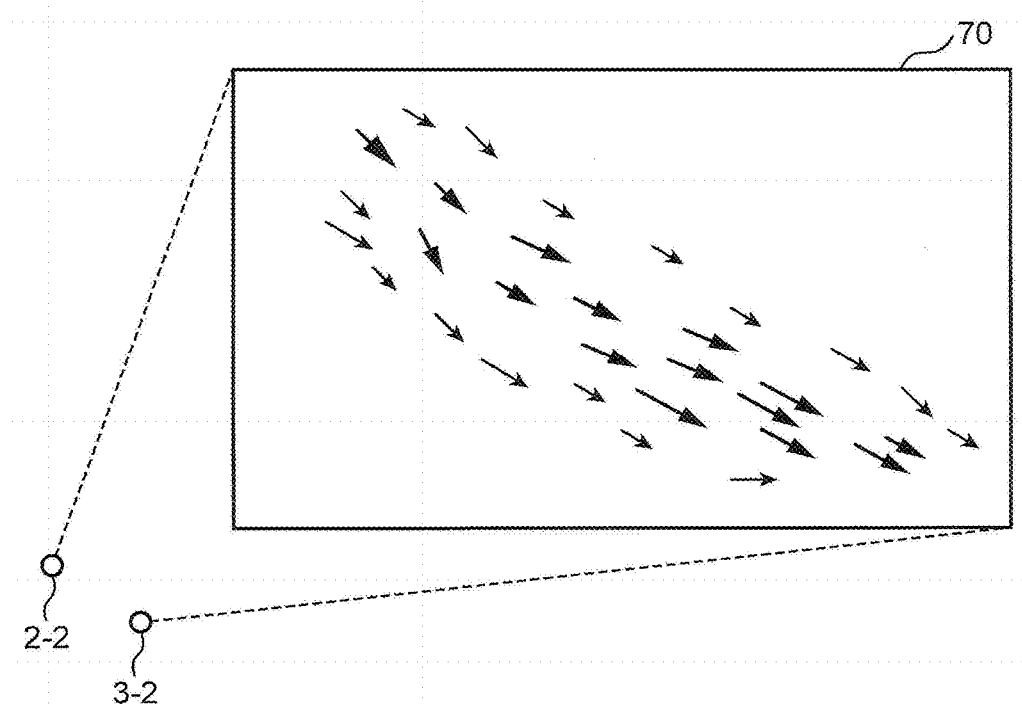
FIG. 5 is an explanatory diagram describing one example of a part of a vector field.

Referring to FIG. 1, the part relevance degree calculation unit 34 uses the CNN to calculate, from the image 10, a vector field (part affinity fields) indicating the connection between pairs of joint candidates (part candidates). FIG. 5 is an explanatory diagram describing one example of a part 70 of the vector field. The part 70 of the vector field illustrated in FIG. 5 shows the connection between the left shoulder joint candidate 2-2 and the left elbow joint candidate 3-2 illustrated in FIG. 4. The part relevance degree calculation unit 34 calculates the vector field by using, for example, a method similar to that used in the calculation of part affinity fields disclosed in Non-Patent Literature 1.

Referring to FIG. 1, the pair generation unit 35 (generation unit) uses the connection information 60 stored in the connection information storage unit 322 to specify part candidates of two types having the relationship of a first part candidate and a second part candidate, from among the part candidates (joint candidates) detected by the part candidate detection unit 33. The first part candidate and the second part candidate are the one and the other of the part candidates (joint candidates) with respect to which matching is to be performed.

Figure 6:
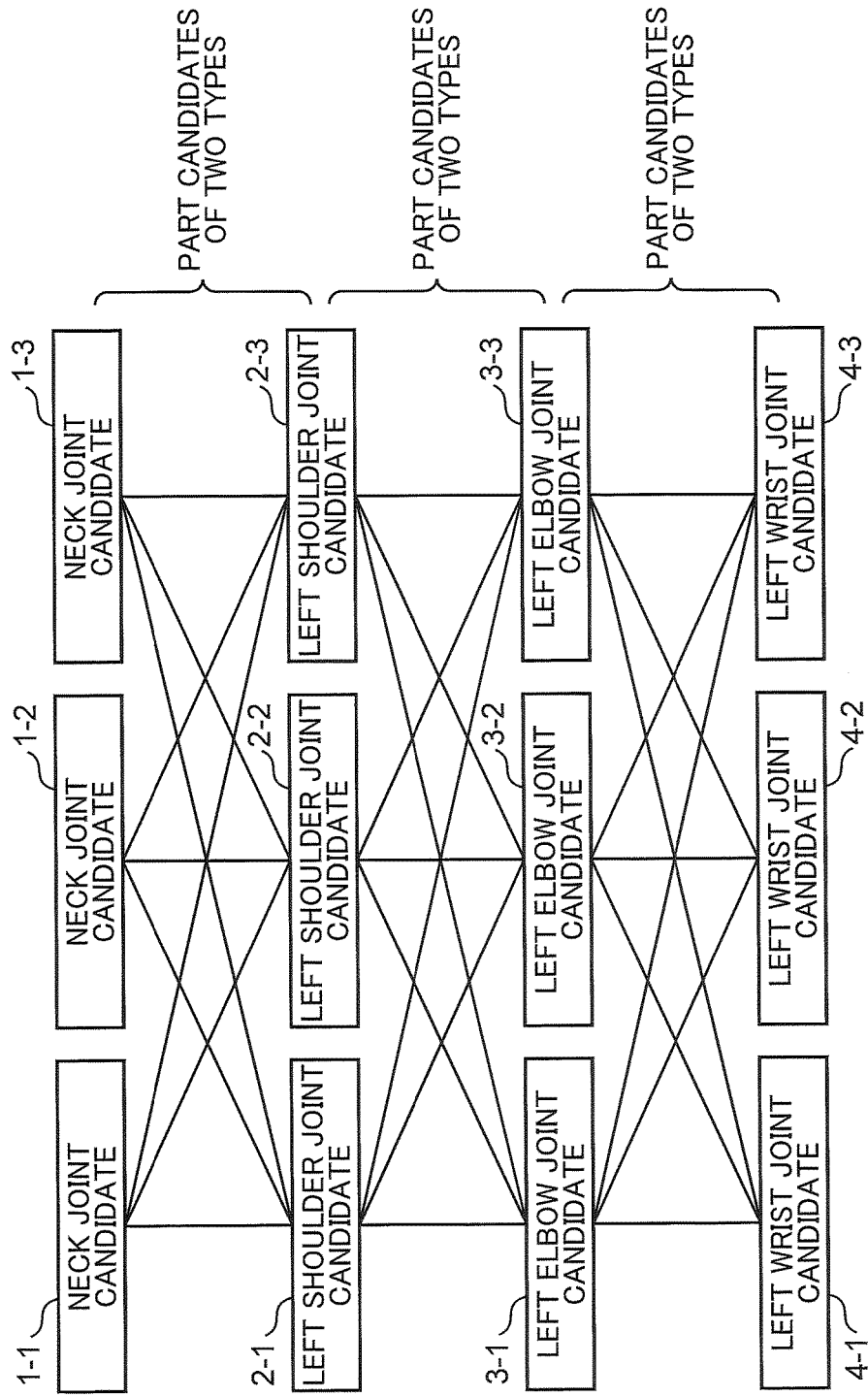
FIG. 6 is an explanatory diagram describing combinations serving as part candidates of two types, among neck joint, left shoulder joint, left elbow joint, and left wrist joint candidates.

Detailed description of the function of the pair generation unit 35 is provided with reference to FIG. 3, FIG. 4, and FIG. 6. FIG. 6 is an explanatory diagram describing combinations serving as the part candidates (joint candidates) of two types, among neck joint candidates 1, left shoulder joint candidates 2, left elbow joint candidates 3, and left wrist joint candidates 4. A neck joint candidate 1 (first part candidate) and a left shoulder joint candidate 2 (second part candidate) are part candidates of two types, a left shoulder joint candidate 2 (first part candidate) and a left elbow joint candidate 3 (second part candidate) are part candidates of two types, and a left elbow joint candidate 3 (first part candidate) and a left wrist joint candidate 4 (second part candidate) are part candidates of two types.

The pair generation unit 35 combines the neck joint candidates 1-1 to 1-3 (plurality of first part candidates) and the left shoulder joint candidates 2-1 to 2-3 (plurality of second part candidates) to generate a plurality of pairs each including a neck joint candidate 1 and a left shoulder joint candidate 2. The nine pairs given in the following are generated.

Pair of the neck joint candidate 1-1 and the left shoulder joint candidate 2-1

Pair of the neck joint candidate 1-1 and the left shoulder joint candidate 2-2

Pair of the neck joint candidate 1-1 and the left shoulder joint candidate 2-3

Pair of the neck joint candidate 1-2 and the left shoulder joint candidate 2-1

Pair of the neck joint candidate 1-2 and the left shoulder joint candidate 2-2

Pair of the neck joint candidate 1-2 and the left shoulder joint candidate 2-3

Pair of the neck joint candidate 1-3 and the left shoulder joint candidate 2-1

Pair of the neck joint candidate 1-3 and the left shoulder joint candidate 2-2

Pair of the neck joint candidate 1-3 and the left shoulder joint candidate 2-3

The pair generation unit 35 combines the left shoulder joint candidates 2-1 to 2-3 (plurality of first part candidates) and the left elbow joint candidates 3-1 to 3-3 (plurality of second part candidates) to generate a plurality of pairs each including a left shoulder joint candidate 2 and a left elbow joint candidate 3. The nine pairs given in the following are generated.

Pair of the left shoulder joint candidate 2-1 and the left elbow joint candidate 3-1

Pair of the left shoulder joint candidate 2-1 and the left elbow joint candidate 3-2

Pair of the left shoulder joint candidate 2-1 and the left elbow joint candidate 3-3

Pair of the left shoulder joint candidate 2-2 and the left elbow joint candidate 3-1

Pair of the left shoulder joint candidate 2-2 and the left elbow joint candidate 3-2

Pair of the left shoulder joint candidate 2-2 and the left elbow joint candidate 3-3

Pair of the left shoulder joint candidate 2-3 and the left elbow joint candidate 3-1

Pair of the left shoulder joint candidate 2-3 and the left elbow joint candidate 3-2

Pair of the left shoulder joint candidate 2-3 and the left elbow joint candidate 3-3

The pair generation unit 35 combines the left elbow joint candidates 3-1 to 3-3 (plurality of first part candidates) and the left wrist joint candidates 4-1 to 4-3 (plurality of second part candidates) to generate a plurality of pairs each including a left elbow joint candidate 3 and a left wrist joint candidate 4. The nine pairs given in the following are generated.

Pair of the left elbow joint candidate 3-1 and the left wrist joint candidate 4-1

Pair of the left elbow joint candidate 3-1 and the left wrist joint candidate 4-2

Pair of the left elbow joint candidate 3-1 and the left wrist joint candidate 4-3

Pair of the left elbow joint candidate 3-2 and the left wrist joint candidate 4-1

Pair of the left elbow joint candidate 3-2 and the left wrist joint candidate 4-2

Pair of the left elbow joint candidate 3-2 and the left wrist joint candidate 4-3

Pair of the left elbow joint candidate 3-3 and the left wrist joint candidate 4-1

Pair of the left elbow joint candidate 3-3 and the left wrist joint candidate 4-2

Pair of the left elbow joint candidate 3-3 and the left wrist joint candidate 4-3

Referring to FIG. 1, the first estimate value calculation unit 36 (first calculation unit) uses the synthesized image 11 generated by the part candidate detection unit 33 and the above-described vector field calculated by the part relevance degree calculation unit 34 to calculate, for each of the plurality of pairs illustrated in FIG. 6, a first estimate value indicating an estimated possibility that the first part candidate and the second part candidate are connected. One example of this calculation method is disclosed in Non-Patent Literature 1. Here, likelihood is used as a first estimate value. Specific examples of first estimate values are illustrated in FIG. 7 to FIG. 9, taking the pairs including the left elbow joint candidates 3 and the left wrist joint candidates 4 as an example.

Figure 7:
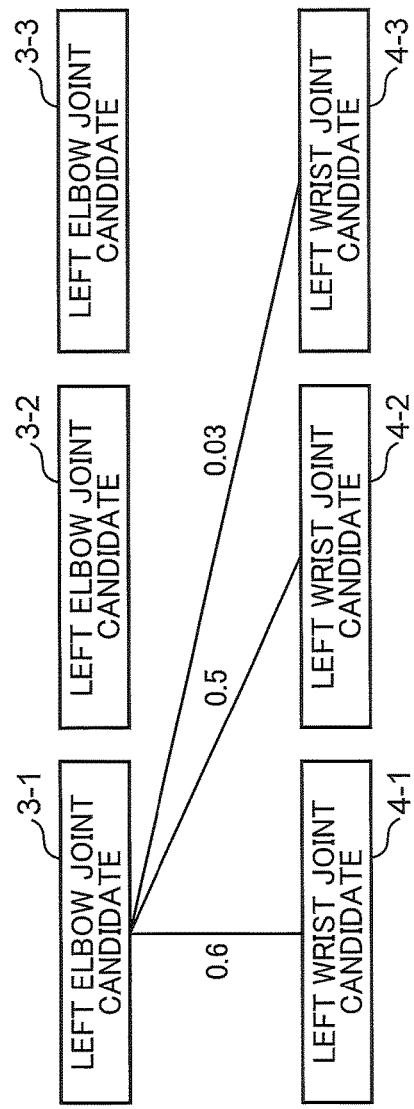
FIG. 7 is an explanatory diagram describing specific examples of first estimate values.

Referring to FIG. 7, the first estimate value for the pair of the left elbow joint candidate 3-1 and the left wrist joint candidate 4-1 is 0.6, the first estimate value for the pair of the left elbow joint candidate 3-1 and the left wrist joint candidate 4-2 is 0.5, and the first estimate value for the pair of the left elbow joint candidate 3-1 and the left wrist joint candidate 4-3 is 0.03.

Figure 8:
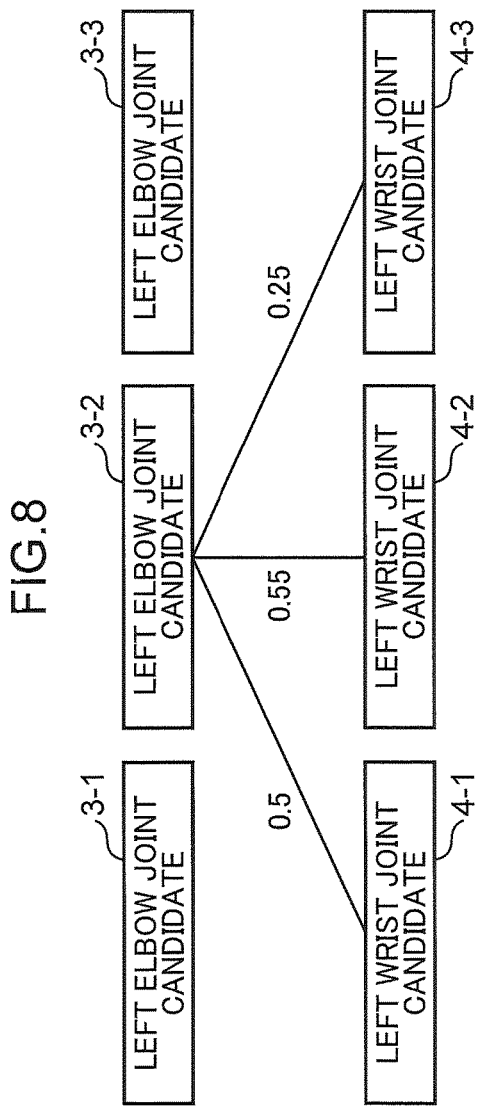
FIG. 8 is an explanatory diagram describing specific examples of first estimate values.

Referring to FIG. 8, the first estimate value for the pair of the left elbow joint candidate 3-2 and the left wrist joint candidate 4-1 is 0.5, the first estimate value for the pair of the left elbow joint candidate 3-2 and the left wrist joint candidate 4-2 is 0.55, and the first estimate value for the pair of the left elbow joint candidate 3-2 and the left wrist joint candidate 4-3 is 0.25.

Figure 9:
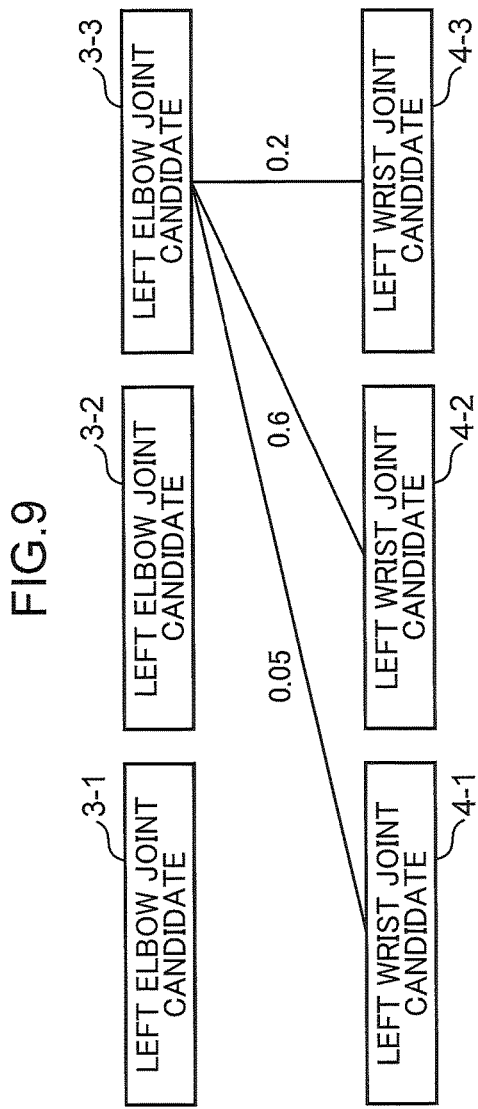
FIG. 9 is an explanatory diagram describing specific examples of first estimate values.

Referring to FIG. 9, the first estimate value for the pair of the left elbow joint candidate 3-3 and the left wrist joint candidate 4-1 is 0.05, the first estimate value for the pair of the left elbow joint candidate 3-3 and the left wrist joint candidate 4-2 is 0.6, and the first estimate value for the pair of the left elbow joint candidate 3-3 and the left wrist joint candidate 4-3 is 0.2.

When matching of a plurality of first part candidates and a plurality of second part candidates is performed by using the first estimate values, there are cases in which parts (e.g., the mouth part of the glove 9 for the left hand and one corner part of the top board of the desk 7, which are illustrated in FIG. 4) that are extraneous to the parts to be detected (for example, left elbow joints and left wrist joints) are connected to the parts to be detected. This is described in detail by using a comparative example. In the comparative example, matching of the left elbow joint candidates 3-1 to 3-3 (plurality of first part candidates) and the left wrist joint candidates 4-1 to 4-3 (plurality of second part candidates) is performed by using first estimate values. In the comparative example, the six combinations as illustrated in FIG. 10 to FIG. 15 exist as combinations of the left elbow joint candidates 3-1 to 3-3 and the left wrist joint candidates 4-1 to 4-3.

Figure 10:
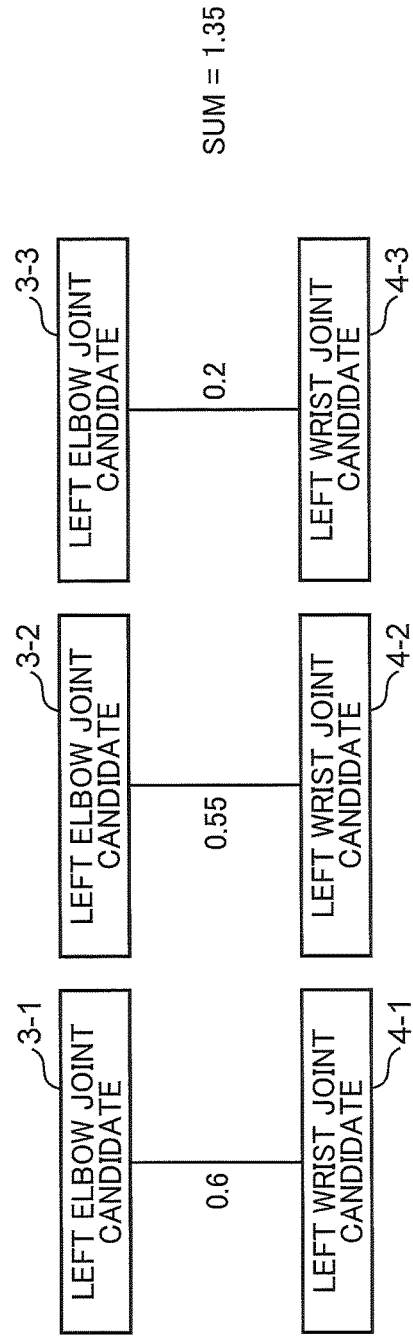
FIG. 10 is an explanatory diagram describing a first combination of left elbow joint candidates and left wrist joint candidates in a comparative example.
Figure 11:
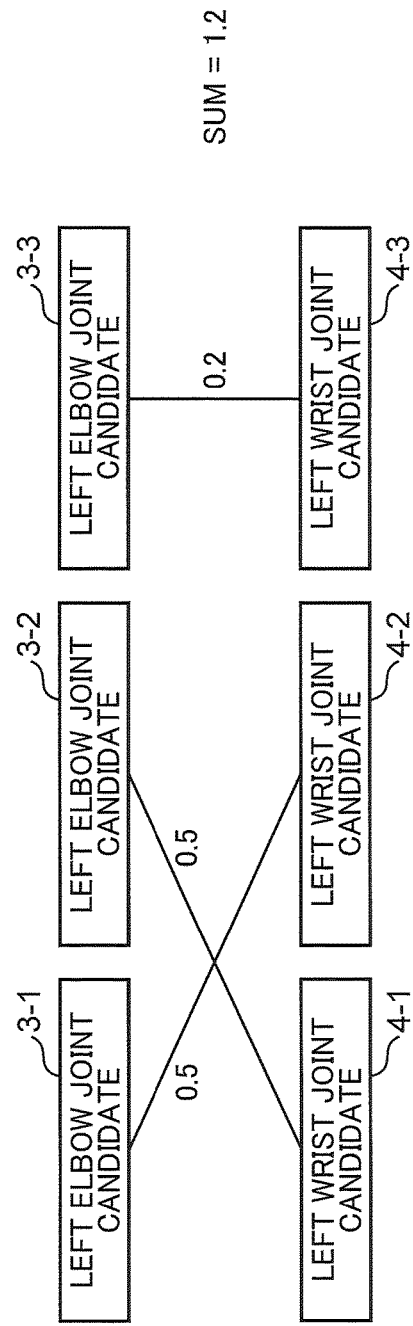
FIG. 11 is an explanatory diagram describing a second combination.
Figure 12:
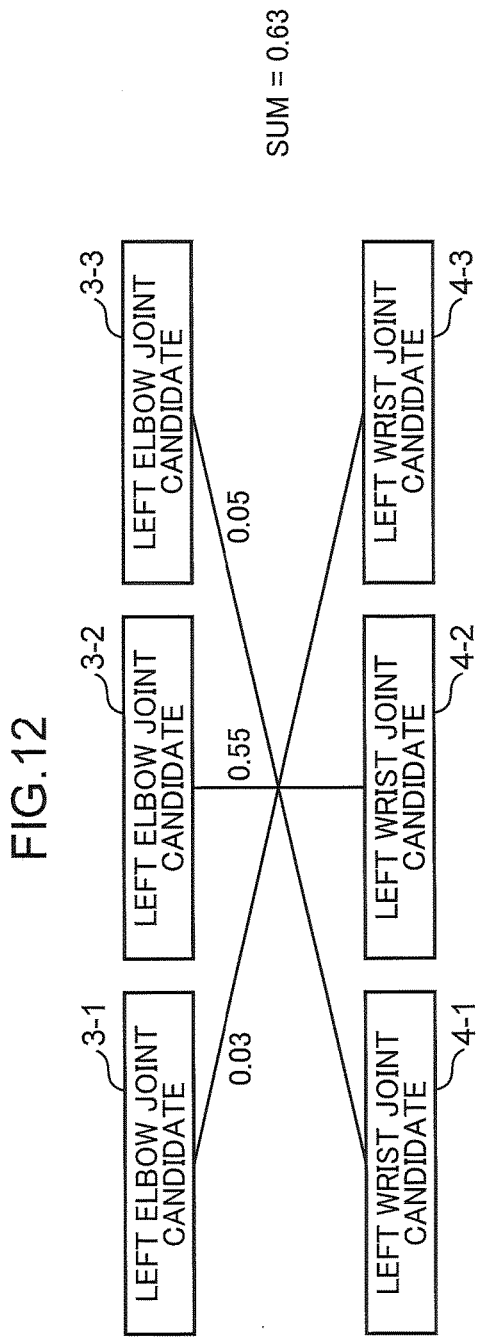
FIG. 12 is an explanatory diagram describing a third combination.
Figure 13:
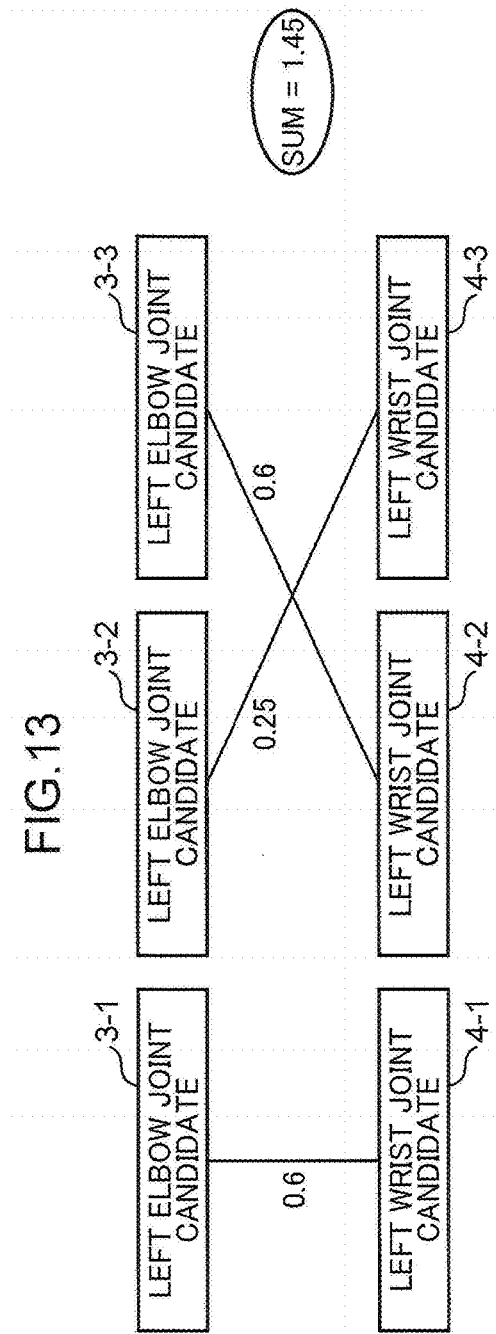
FIG. 13 is an explanatory diagram describing a fourth combination.
Figure 14:
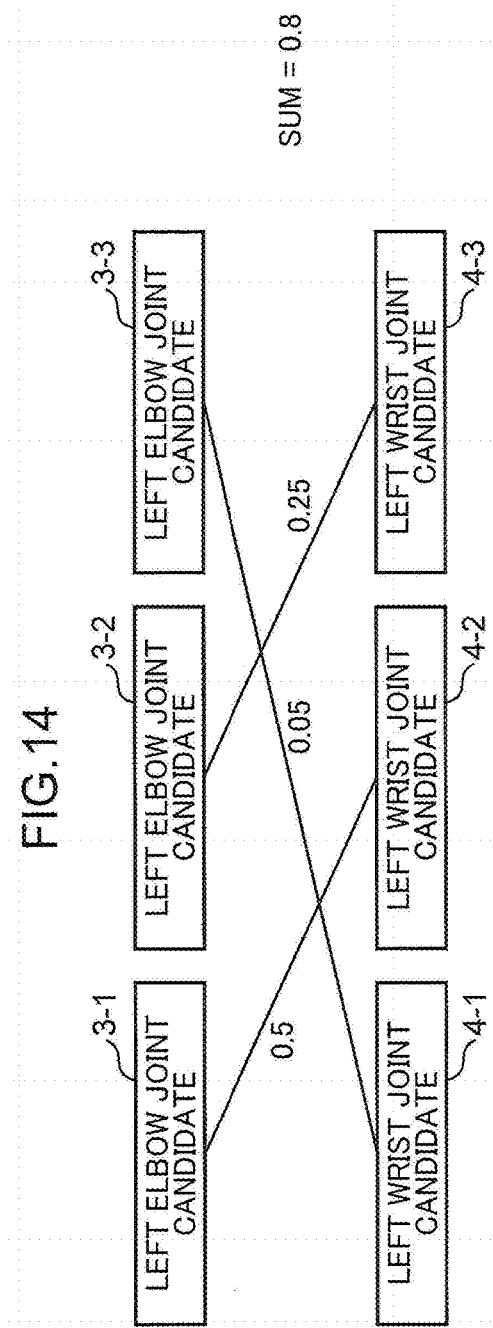
FIG. 14 is an explanatory diagram describing a fifth combination.
Figure 15:
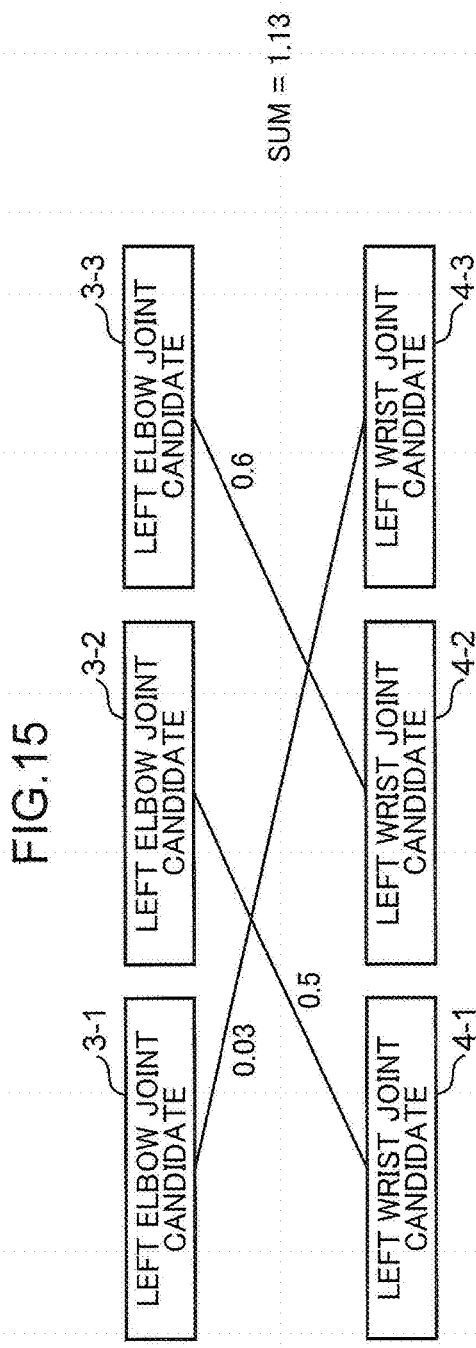
FIG. 15 is an explanatory diagram describing a sixth combination.

FIG. 10 is an explanatory view describing the first combination of the left elbow joint candidates 3-1 to 3-3 and the left wrist joint candidates 4-1 to 4-3 in the comparative example. FIG. 11 is an explanatory diagram describing the second combination. FIG. 12 is an explanatory diagram describing the third combination. FIG. 13 is an explanatory diagram describing the fourth combination. FIG. 14 is an explanatory diagram describing the fifth combination. FIG. 15 is an explanatory diagram describing the sixth combination. The numerals in these drawings each indicate a first estimate value (value indicating an estimated possibility that a left elbow joint candidate 3 and a left wrist joint candidate 4 are connected).

FIG. 10 indicates a case when the left elbow joint candidate 3-1 and the left wrist joint candidate 4-1 are connected, the left elbow joint candidate 3-2 and the left wrist joint candidate 4-2 are connected, and the left elbow joint candidate 3-3 and the left wrist joint candidate 4-3 are connected. FIG. 11 indicates a case when the left elbow joint candidate 3-1 and the left wrist joint candidate 4-2 are connected, the left elbow joint candidate 3-2 and the left wrist joint candidate 4-1 are connected, and the left elbow joint candidate 3-3 and the left wrist joint candidate 4-3 are connected. FIG. 12 indicates a case when the left elbow joint candidate 3-1 and the left wrist joint candidate 4-3 are connected, the left elbow joint candidate 3-2 and the left wrist joint candidate 4-2 are connected, and the left elbow joint candidate 3-3 and the left wrist joint candidate 4-1 are connected.

FIG. 13 indicates a case when the left elbow joint candidate 3-1 and the left wrist joint candidate 4-1 are connected, the left elbow joint candidate 3-2 and the left wrist joint candidate 4-3 are connected, and the left elbow joint candidate 3-3 and the left wrist joint candidate 4-2 are connected. FIG. 14 indicates a case when the left elbow joint candidate 3-1 and the left wrist joint candidate 4-2 are connected, the left elbow joint candidate 3-2 and the left wrist joint candidate 4-3 are connected, and the left elbow joint candidate 3-3 and the left wrist joint candidate 4-1 are connected. FIG. 15 indicates a case when the left elbow joint candidate 3-1 and the left wrist joint candidate 4-3 are connected, the left elbow joint candidate 3-2 and the left wrist joint candidate 4-1 are connected, and the left elbow joint candidate 3-3 and the left wrist joint candidate 4-2 are connected.

The first estimate values shown in FIG. 10 to FIG. 15 are selected from the first estimate values illustrated in FIG. 7 to FIG. 9. This is described taking FIG. 10 as an example. Referring to FIG. 10, the first estimate value 0.6 for the pair of the left elbow joint candidate 3-1 and the left wrist joint candidate 4-1 is the first estimate value 0.6 illustrated in FIG. 7. The first estimate value 0.55 for the pair of the left elbow joint candidate 3-2 and the left wrist joint candidate 4-2 is the first estimate value 0.55 illustrated in FIG. 8. The first estimate value 0.2 for the pair of the left elbow joint candidate 3-3 and the left wrist joint candidate 4-3 is the first estimate value 0.2 illustrated in FIG. 9.

In the case of the combination illustrated in FIG. 10, the sum of the first estimate values is 1.35. In the case of the combination illustrated in FIG. 11, the sum of the first estimate values is 1.2. In the case of the combination illustrated in FIG. 12, the sum of the first estimate values is 0.63. In the case of the combination illustrated in FIG. 13, the sum of the first estimate values is 1.45. In the case of the combination illustrated in FIG. 14, the sum of the first estimate values is 0.8. In the case of the combination illustrated in FIG. 15, the sum of the first estimate values is 1.13.

The combination for which the sum of first estimate values is largest is adopted as a match. Here, the combination illustrated in FIG. 13 is adopted as a match. Referring to FIG. 4 and FIG. 13, the left elbow joint candidate 3-2 (the left elbow joint of the person 6) and the left wrist candidate 4-3 (the mouth part of the glove 9 for the left hand) are connected, and the left elbow joint candidate 3-3 (one corner part of the top board of the desk 7) and left wrist joint candidate 4-2 (the left wrist joint of the person 6) are connected. This is because, as illustrated in FIG. 9, the first estimate value for the pair of the left elbow joint candidate 3-3 and the left wrist joint candidate 4-2 is relatively large.

In view of this, in the embodiment, matching is performed by using corrected first estimate values. With reference to FIG. 1, the first estimate value correction unit 37 (correction unit) executes, for each of the plurality of pairs, processing of correcting the first estimate value by using a second estimate value as a weight when a part candidate that is one among a pair of part candidates matching of which has already been performed and that differs from both the first part candidate and the second part candidate is connected to either the first part candidate or the second part candidate, the second estimate value indicating an estimated possibility that the pair of part candidates matching of which has already been performed are connected. Detailed description is provided in the following.

The second estimate value is a value indicating an estimated possibility that a pair of part candidates matching of which has already been performed are connected. Description regarding second estimate values is provided by using the comparative example. As described above, in the comparative example, the combination illustrated in FIG. 13 is adopted as a match. Each of the following first estimate values becomes a second estimate value: the first estimate value 0.6 for the pair of the left elbow joint candidate 3-1 and the left wrist joint candidate 4-1; the first estimate value 0.25 for the pair of the left elbow joint candidate 3-2 and the left wrist joint candidate 4-3; and the first estimate value 0.6 for the pair of the left elbow joint candidate 3-3 and the left wrist joint candidate 4-2. That is, a value indicating an estimated possibility that a pair of part candidates matching of which has been performed are connected is a first estimate value before matching and becomes a second estimate value after matching.

Figure 16:
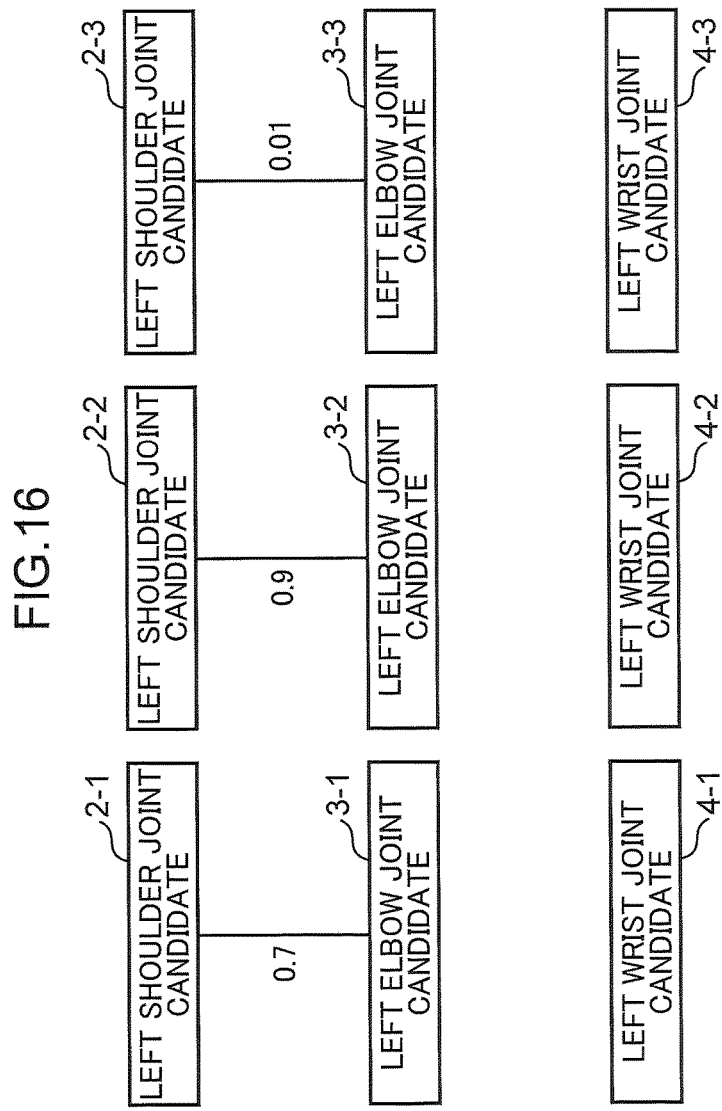
FIG. 16 is an explanatory diagram describing a state in which matching of left shoulder joint candidates and left elbow joint candidates has already been performed and matching of left elbow joint candidates and left wrist joint candidates has not yet been performed.

Further description regarding second estimate values is provided with reference to FIG. 16. FIG. 16 is an explanatory diagram describing a state in which matching of the left shoulder joint candidates 2 and the left elbow joint candidates 3 has already been performed and matching of the left elbow joint candidates 3 and the left wrist joint candidates 4 has not yet been performed. The left elbow joint candidates 3 are the first part candidates and the left wrist joint candidates 4 are the second part candidates. The left shoulder joint candidates 2 and the left elbow joint candidates 3 are a pair of part candidates matching of which has already been performed, and the left shoulder joint candidates 2 are one among the pair of part candidates. In this case, the left shoulder joint candidates 2 (one among the pair of part candidates) differ from both the left elbow joint candidates 3 (first part candidates) and the left wrist joint candidates 4 (second part candidates) and also are connected to the left elbow joint candidates 3 (first part candidates). A value indicating the estimated possibility that a left shoulder joint candidate 2 and a left elbow joint candidate 3 are connected is a second estimate value. That is, each of the following first estimate values is a second estimate value: the first estimate value 0.7 for the pair of the left shoulder joint candidate 2-1 and the left elbow joint candidate 3-1; the first estimate value 0.9 for the pair of the left shoulder joint candidate 2-2 and the left elbow joint candidate 3-2; and the first estimate value 0.01 for the pair of the left shoulder joint candidate 2-3 and the left elbow joint candidate 3-3.

Note that when there are two or more pairs of part candidates matching of which has already been performed, any pair of part candidates may be used. For example, suppose that the neck joint candidates 1 (FIG. 6) and the left shoulder joint candidates 2 are a pair of part candidates matching of which has already been performed, and also, the left shoulder joint candidates 2 and left elbow joint candidates 3 are a pair of part candidates matching of which has already been performed. In this case, the values indicating the estimated possibility that the neck joint candidates 1 and the left shoulder joint candidates 2 are connected may be used as second estimate values, or the values indicating the estimated possibility that the left shoulder joint candidates 2 and the left elbow joint candidates 3 are connected may be used as second estimate values.

The connection between one among the pair of part candidates and the first or second part candidate may be direct or indirect. For example, suppose that, as a result of matching having been performed, right shoulder joint candidates (not shown) and the neck joint candidates 1 are already connected, the neck joint candidates 1 and the left shoulder joint candidates 2 are already connected, and the left shoulder joint candidates 2 and the left elbow joint candidates 3 are already connected. In this case, the left elbow joint candidates 3 (first part candidates) are directly connected to the left shoulder joint candidates 2 (one among the pair of part candidates), are indirectly connected to the neck joint candidates 1 (one among the pair of part candidates), and are indirectly connected to the right shoulder joint candidates (one among the pair of part candidates).

Description has been provided based on a case in which one among the pair of part candidates (the left shoulder joint candidates 2) are connected to the first part candidates (the left elbow joint candidates 3). However, when supposing that the left wrist joint candidates 4 are the first part candidates and the left elbow joint candidates 3 are the second part candidates, one among the pair of part candidates (the left shoulder joint candidates 2) would be connected to the left elbow joint candidates 3 (the second part candidates).

With reference to FIG. 1, the first estimate value correction unit 37 executes, for each of the plurality of pairs generated by the pair generation unit 35, processing of correcting the first estimate value by using a second estimate value as a weight. In the embodiment, a value yielded by multiplying a first estimate value and a second estimate value is set as a corrected first estimate value. However, the present invention is not limited to this, and for example, a value yielded by adding a first estimate value and a second estimate value may be set as a corrected first estimate value.

Figure 17:
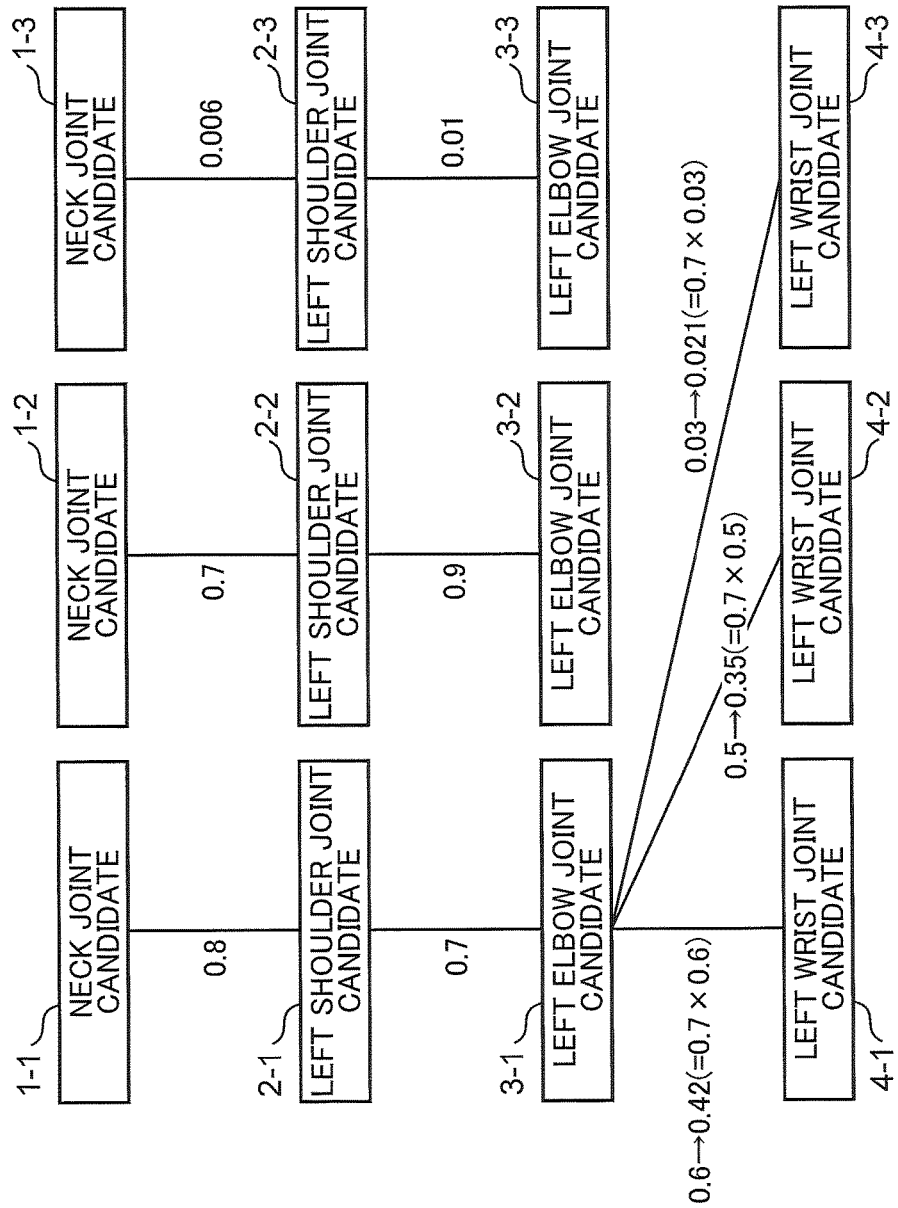
FIG. 17 is an explanatory diagram describing specific examples of corrected first estimate values.
Figure 18:
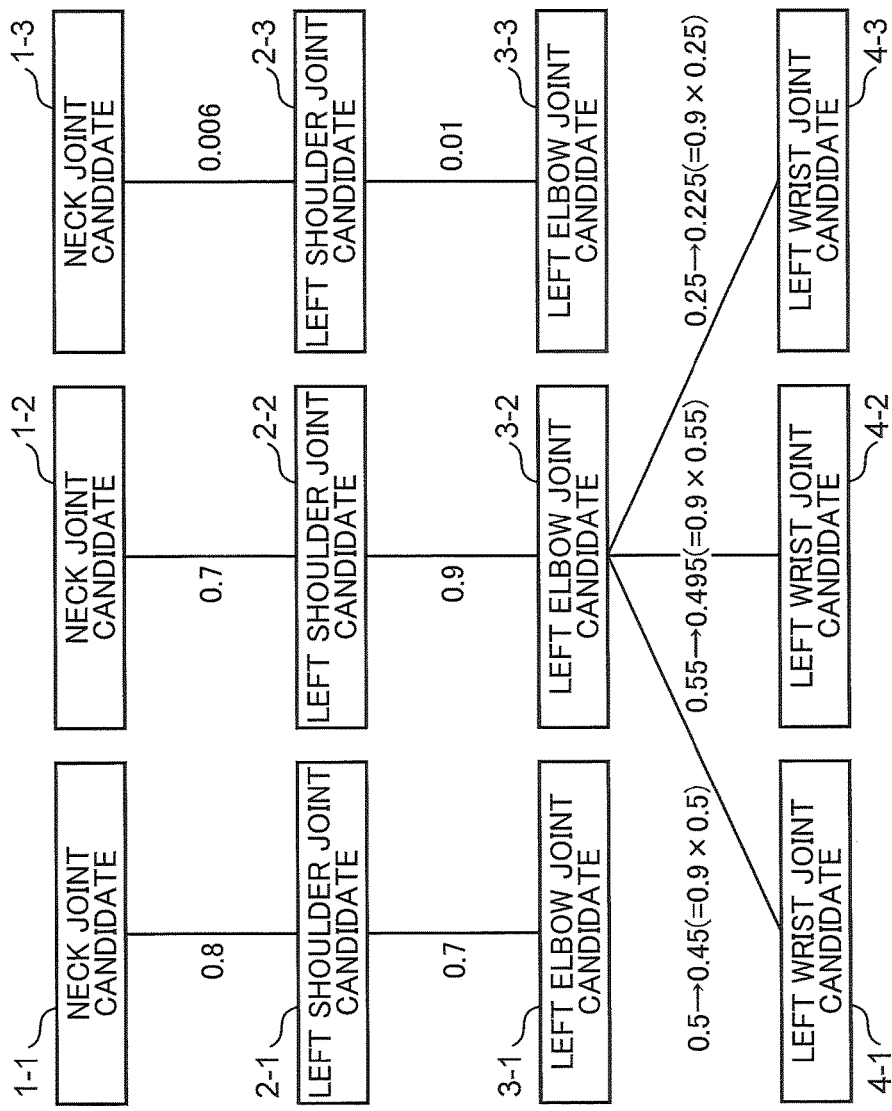
FIG. 18 is an explanatory diagram describing specific examples of corrected first estimate values.
Figure 19:
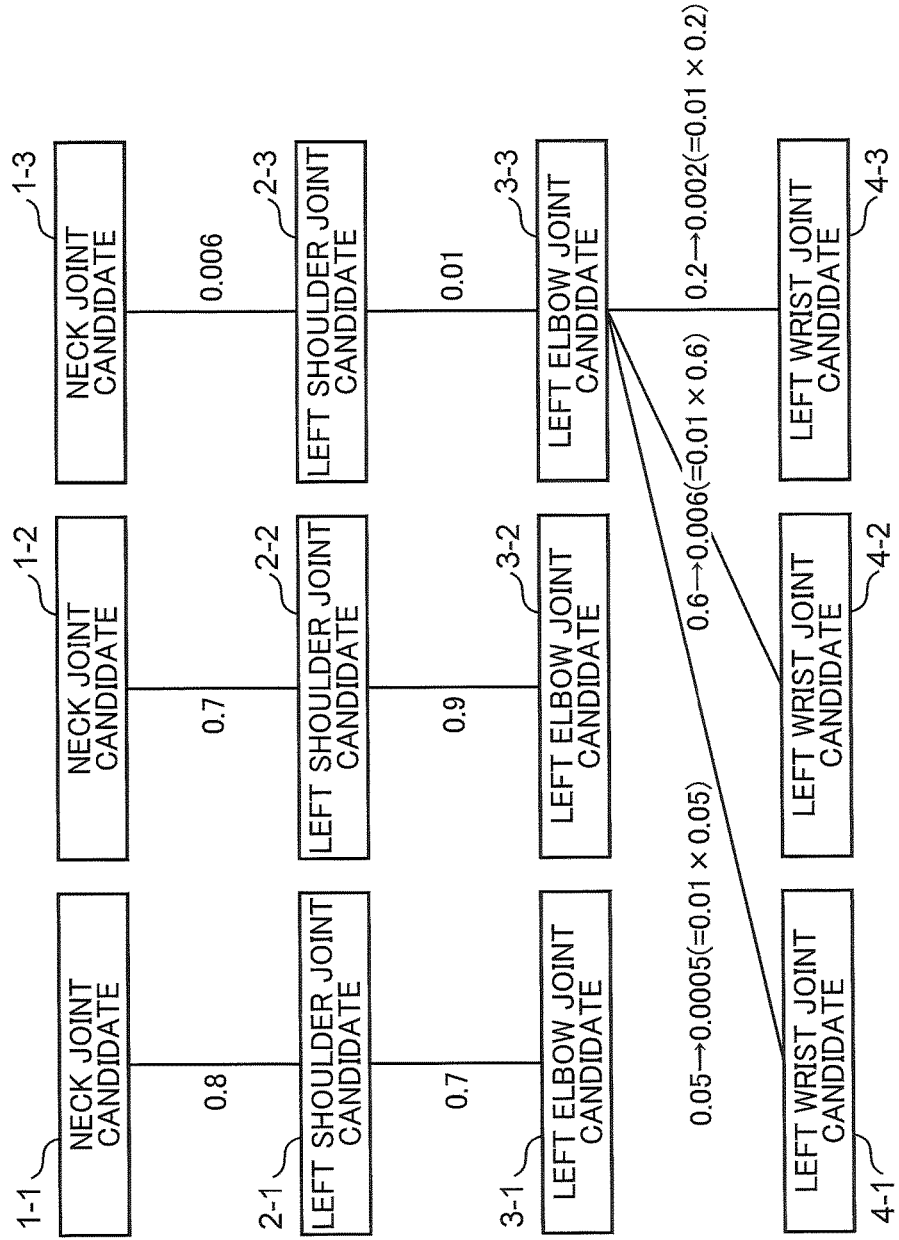
FIG. 19 is an explanatory diagram describing specific examples of corrected first estimate values.

Description is provided of specific examples of the corrected first estimate values with reference to FIG. 17 to FIG. 19. Matching of the neck joint candidates 1 and the left shoulder joint candidates 2 has already been performed, and matching of the left shoulder joint candidates 2 and the left elbow joint candidates 3 has already been performed. Matching of the left elbow joint candidates 3 and the left wrist joint candidates 4 has not been performed yet. The values indicating the connection between the neck joint candidates 1 and the left shoulder joint candidates 2 and the values indicating the connection between the left shoulder joint candidates 2 and the left elbow joint candidates 3 are both second estimate values. The first estimate value correction unit 37 corrects first estimate values by multiplying the first estimate values and the latter ones of the above-described second estimate values.

Referring to FIG. 17, for the pair of the left elbow joint candidate 3-1 and the left wrist joint candidate 4-1, the first estimate value is 0.6 and the corrected first estimate value is 0.42. For the pair of the left elbow joint candidate 3-1 and the left wrist joint candidate 4-2, the first estimate value is 0.5 and the corrected first estimate value is 0.35. For the pair of the left elbow joint candidate 3-1 and the left wrist joint candidate 4-3, the first estimate value is 0.03 and the corrected first estimate value is 0.021.

Referring to FIG. 18, for the pair of the left elbow joint candidate 3-2 and the left wrist joint candidate 4-1, the first estimate value is 0.5 and the corrected first estimate value is 0.45. For the pair of the left elbow joint candidate 3-2 and the left wrist joint candidate 4-2, the first estimate value is 0.55 and the corrected first estimate value is 0.495. For the pair of the left elbow joint candidate 3-2 and the left wrist joint candidate 4-3, the first estimate value is 0.25 and the corrected first estimate value is 0.225.

Referring to FIG. 19, for the pair of the left elbow joint candidate 3-3 and the left wrist joint candidate 4-1, the first estimate value is 0.05 and the corrected first estimate value is 0.0005. For the pair of the left elbow joint candidate 3-3 and the left wrist joint candidate 4-2, the first estimate value is 0.6 and the corrected first estimate value is 0.006. For the pair of the left elbow joint candidate 3-3 and the left wrist joint candidate 4-3, the first estimate value is 0.2 and the corrected first estimate value is 0.002.

Referring to FIG. 1, the matching unit 38 performs matching of the plurality of first part candidates and the plurality of second part candidates based on the corrected first estimate values for the respective ones of the plurality of pairs. Detailed description of the matching is provided with reference to FIG. 20 to FIG. 25.

Figure 20:
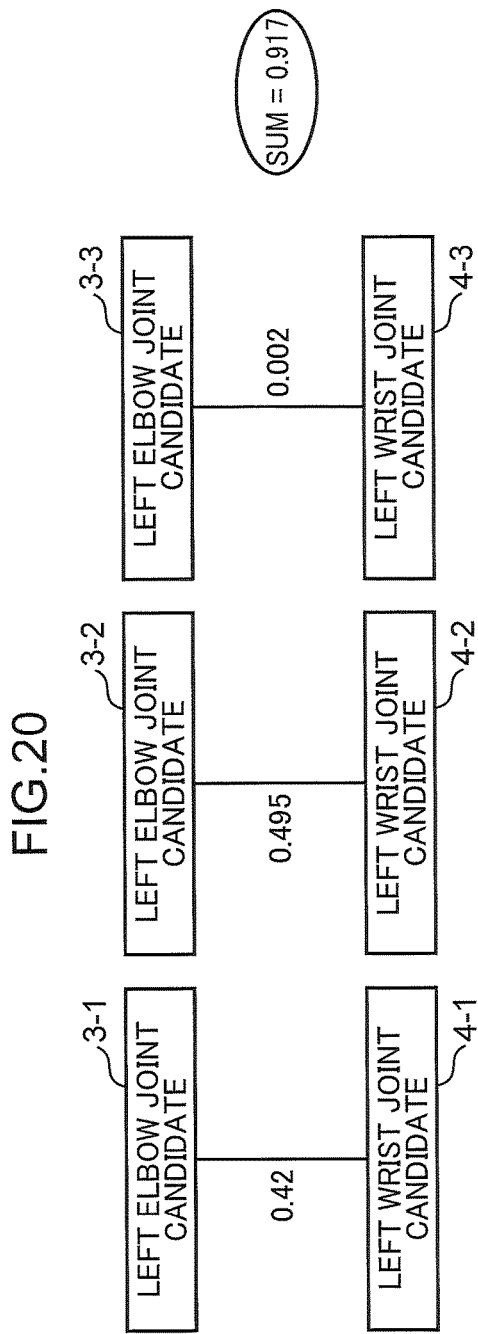
FIG. 20 is an explanatory diagram illustrating a first combination of left elbow joint candidates and left wrist joint candidates in the embodiment.
Figure 21:
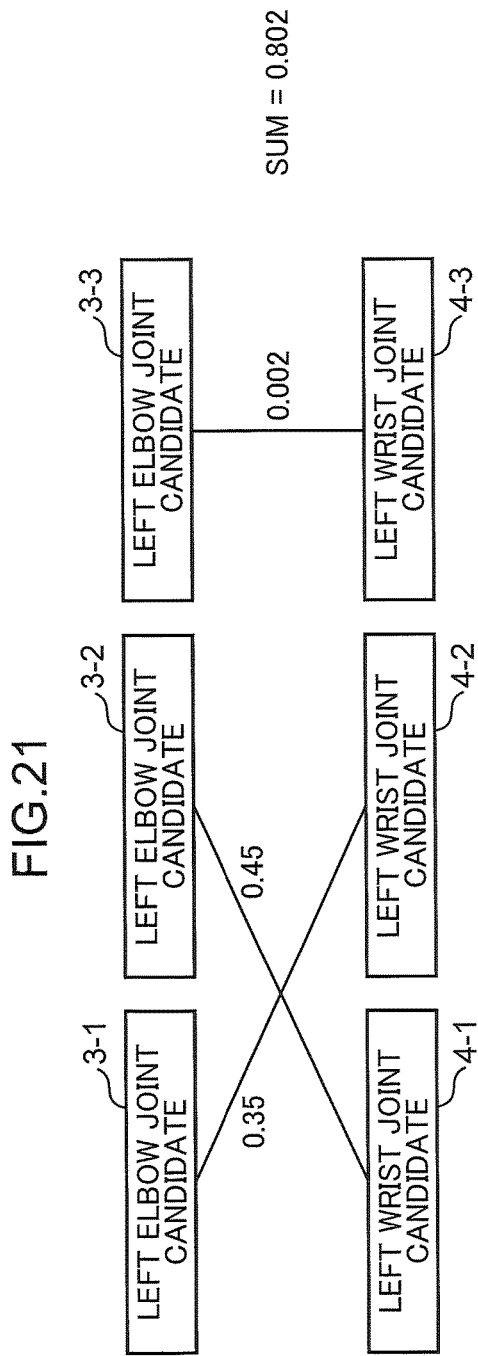
FIG. 21 is an explanatory diagram describing a second combination.
Figure 22:
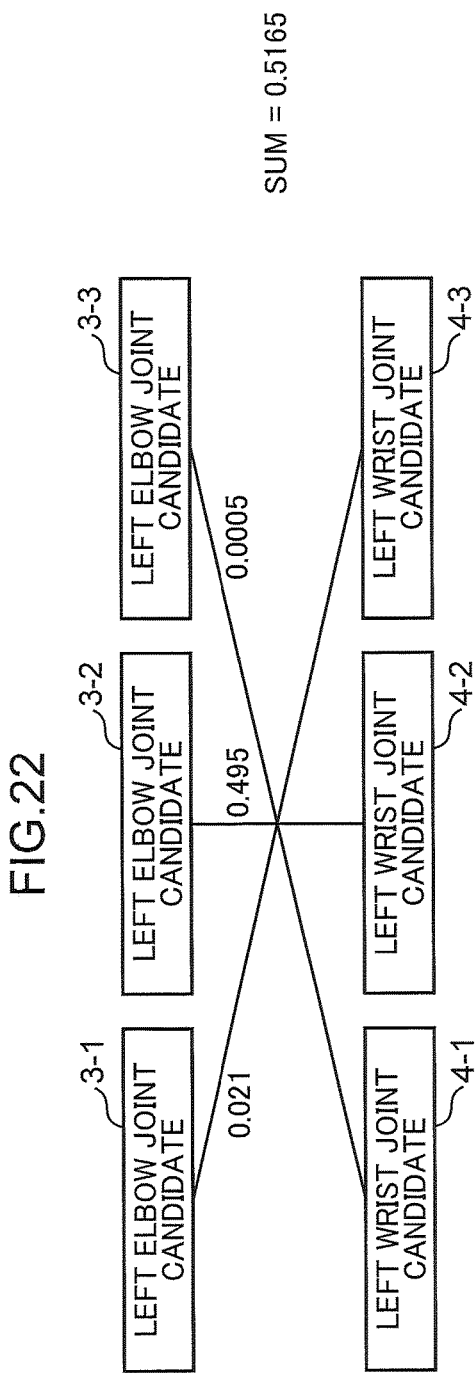
FIG. 22 is an explanatory diagram describing a third combination.
Figure 23:
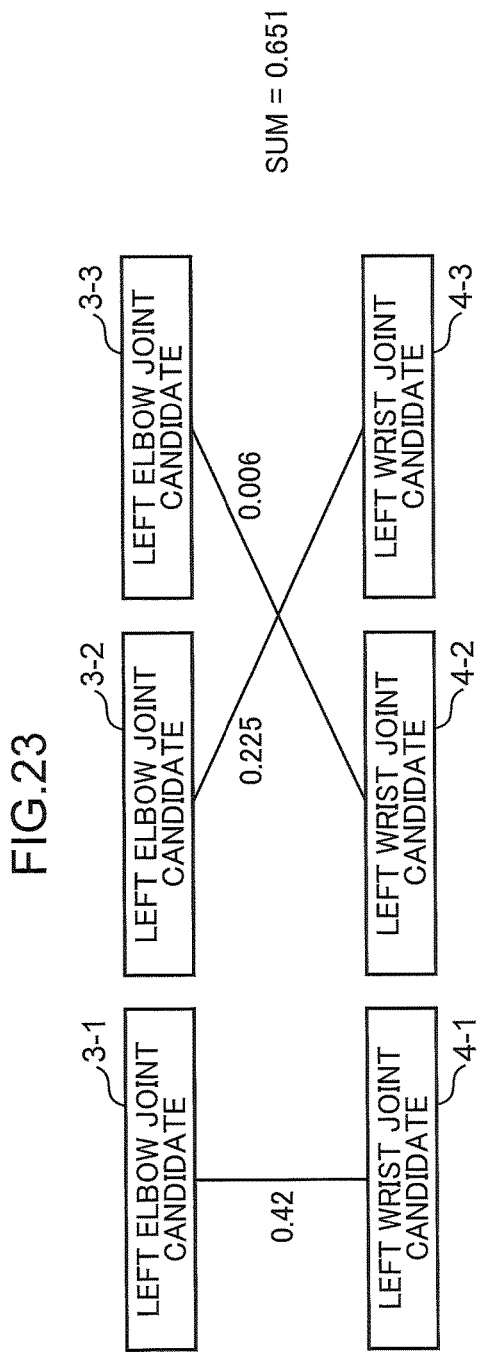
FIG. 23 is an explanatory diagram describing a fourth combination.
Figure 24:
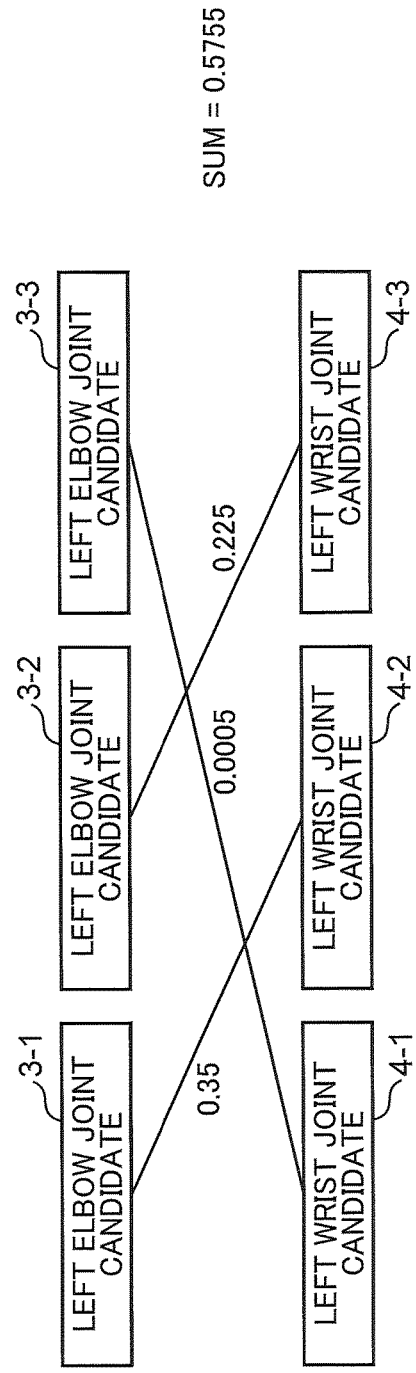
FIG. 24 is an explanatory diagram describing a fifth combination.
Figure 25:
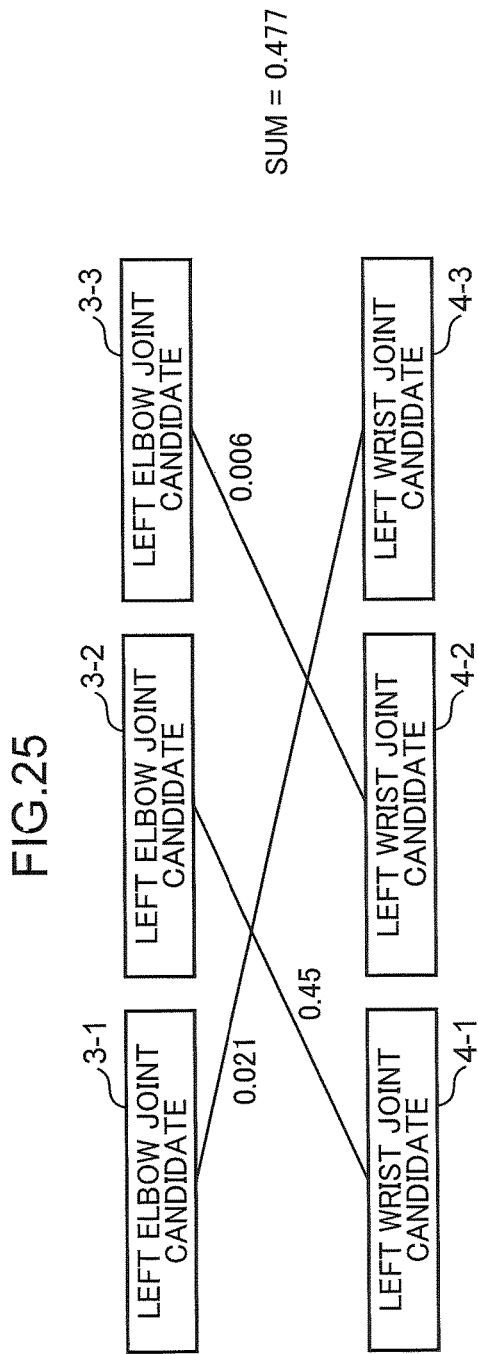
FIG. 25 is an explanatory diagram describing a sixth combination.

FIG. 20 is an explanatory diagram describing the first combination of the left elbow joint candidates 3-1 to 3-3 and the left wrist joint candidates 4-1 to 4-3 in the embodiment. FIG. 21 is an explanatory diagram describing the second combination. FIG. 22 is an explanatory diagram describing the third combination. FIG. 23 is an explanatory diagram describing the fourth combination. FIG. 24 is an explanatory diagram describing the fifth combination. FIG. 25 is an explanatory diagram describing the sixth combination. The numerals in these drawings each indicate a corrected first estimate value.

Similarly to FIG. 10, FIG. 20 illustrates a case when the left elbow joint candidate 3-1 and the left wrist joint candidate 4-1 are connected, the left elbow joint candidate 3-2 and the left wrist joint candidate 4-2 are connected, and the left elbow joint candidate 3-3 and the left wrist joint candidate 4-3 are connected. Similarly to FIG. 11, FIG. 21 illustrates a case when the left elbow joint candidate 3-1 and the left wrist joint candidate 4-2 are connected, the left elbow joint candidate 3-2 and the left wrist joint candidate 4-1 are connected, and the left elbow joint candidate 3-3 and the left wrist joint candidate 4-3 are connected. Similarly to FIG. 12, FIG. 22 illustrates a case when the left elbow joint candidate 3-1 and the left wrist joint candidate 4-3 are connected, the left elbow joint candidate 3-2 and the left wrist joint candidate 4-2 are connected, and the left elbow joint candidate 3-3 and the left wrist joint candidate 4-1 are connected.

Similarly to FIG. 13, FIG. 23 illustrates a case when the left elbow joint candidate 3-1 and the left wrist joint candidate 4-1 are connected, the left elbow joint candidate 3-2 and the left wrist joint candidate 4-3 are connected, and the left elbow joint candidate 3-3 and the left wrist joint candidate 4-2 are connected. Similarly to FIG. 14, FIG. 24 illustrates a case when the left elbow joint candidate 3-1 and the left wrist joint candidate 4-2 are connected, the left elbow joint candidate 3-2 and the left wrist joint candidate 4-3 are connected, and the left elbow joint candidate 3-3 and the left wrist joint candidate 4-1 are connected. Similarly to FIG. 15, FIG. 25 illustrates a case when the left elbow joint candidate 3-1 and the left wrist joint candidate 4-3 are connected, the left elbow joint candidate 3-2 and the left wrist joint candidate 4-1 are connected, and the left elbow joint candidate 3-3 and the left wrist joint candidate 4-2 are connected.

The first estimate values illustrated in FIG. 20 to FIG. 25 are selected from the estimate values illustrated in FIG. 17 to FIG. 19. This is described taking FIG. 20 as an example. Referring to FIG. 20, the corrected first estimate value 0.42 for the pair of the left elbow joint candidate 3-1 and the left wrist joint candidate 4-1 is the corrected first estimate value 0.42 illustrated in FIG. 17. The corrected first estimate value 0.495 for the pair of the left elbow joint candidate 3-2 and the left wrist joint candidate 4-2 is the corrected first estimate value 0.495 illustrated in FIG. 18. The corrected first estimate value 0.002 for the pair of the left elbow joint candidate 3-3 and the left wrist joint candidate 4-3 is the corrected first estimate value 0.002 illustrated in FIG. 19.

In the case of the combination illustrated in FIG. 20, the sum of the corrected first estimate values is 0.917. In the case of the combination illustrated in FIG. 21, the sum of the corrected first estimate values is 0.802. In the case of the combination illustrated in FIG. 22, the sum of the corrected first estimate values is 0.5165. In the case of the combination illustrated in FIG. 23, the sum of the corrected first estimate values is 0.651. In the case of the combination illustrated in FIG. 24, the sum of the corrected first estimate values is 0.5755. In the case of the combination illustrated in FIG. 25, the sum of the corrected first estimate values is 0.477.

The combination for which the sum of corrected first estimate values is largest is adopted as a match. Here, the combination illustrated in FIG. 20 is adopted as a match. Referring to FIG. 4 and FIG. 20, the left elbow joint candidate 3-1 (the left elbow joint of the person 5) and the left wrist joint candidate 4-1 (the left wrist joint of the person 5) are connected, the left elbow joint candidate 3-2 (the left elbow joint of the person 6) and the left wrist joint candidate 4-2 (the left wrist joint of the person 6) are connected, and the left elbow joint candidate 3-3 (one corner part of the top board of the desk 7) and the left wrist joint candidate 4-3 (the mouth part of the glove 9 for the left hand) are connected. Unlike the comparative example illustrated in FIG. 13, in the embodiment, a situation is prevented in which joints candidates (the left elbow joint candidate 3-3 and the left wrist joint candidate 4-3) indicating parts (the glove 9 for the left hand placed on the desk 7, and one corner part of the top board of the desk 7) that are extraneous to joints are connected to joint candidates (the left elbow joint candidate 3-2 and the left wrist joint candidate 4-2) that indicate joints (the left elbow joint and the left wrist joint of person 6).

Description is provided of the reason for this. The relevance of an extraneous part with respect to a joint is weak, and thus, a first estimate value for a pair of a joint candidate indicating an extraneous part and a joint candidate indicating a joint is normally low. However, there are cases in which the first estimate value for such a pair becomes a large value due to coincidence. For example, referring to FIG. 4 and FIG. 9, the first estimate value for the pair of the left elbow joint candidate 3-3 (one corner part of the top board of the desk 7) and the left wrist joint candidate 4-2 (the left wrist joint of the person 6) is 0.6. Therefore, when matching of joint candidates is performed by using the first estimate values, there are cases in which a joint candidate indicating an extraneous part and a joint candidate indicating a joint are connected, as illustrated in FIG. 13.

Since the relevance of extraneous parts with respect to one another is weak, a second estimate value indicating an estimated possibility that a pair of extraneous parts matching of which has already been performed are connected is normally small or extremely small. For example, as illustrated in FIG. 17 to FIG. 19, a second estimate value indicating an estimated possibility that the neck joint candidate 1-3 (the bottom end part of one leg of the chair 8) and the left shoulder joint candidate 2-3 (the bottom end part of one leg of the desk 7) are connected is 0.006, and a second estimate value indicating an estimated possibility that the left shoulder joint candidate 2-3 and the left elbow joint candidate 3-3 (one corner part of the top board of the desk 7) are connected is 0.01. Therefore, even if a first estimate value for a pair of a joint and an extraneous part is large, a value (corrected first estimate value) yielded by multiplying the first estimate value and a second estimate value becomes small or extremely small. Accordingly, when matching of joint candidates is performed by using the corrected first estimate values, a situation can be prevented in which joint candidates (the left elbow joint candidate 3-3 and the left wrist joint candidate 4-3) indicating extraneous parts and joint candidates (the left elbow joint candidate 3-2 and the left wrist joint candidate 4-2) indicating joints are connected. As described up to this point, according to the embodiment, the matching accuracy of joint candidates detected from the image 10, in which a plurality of people are captured, can be improved.

Figure 26:
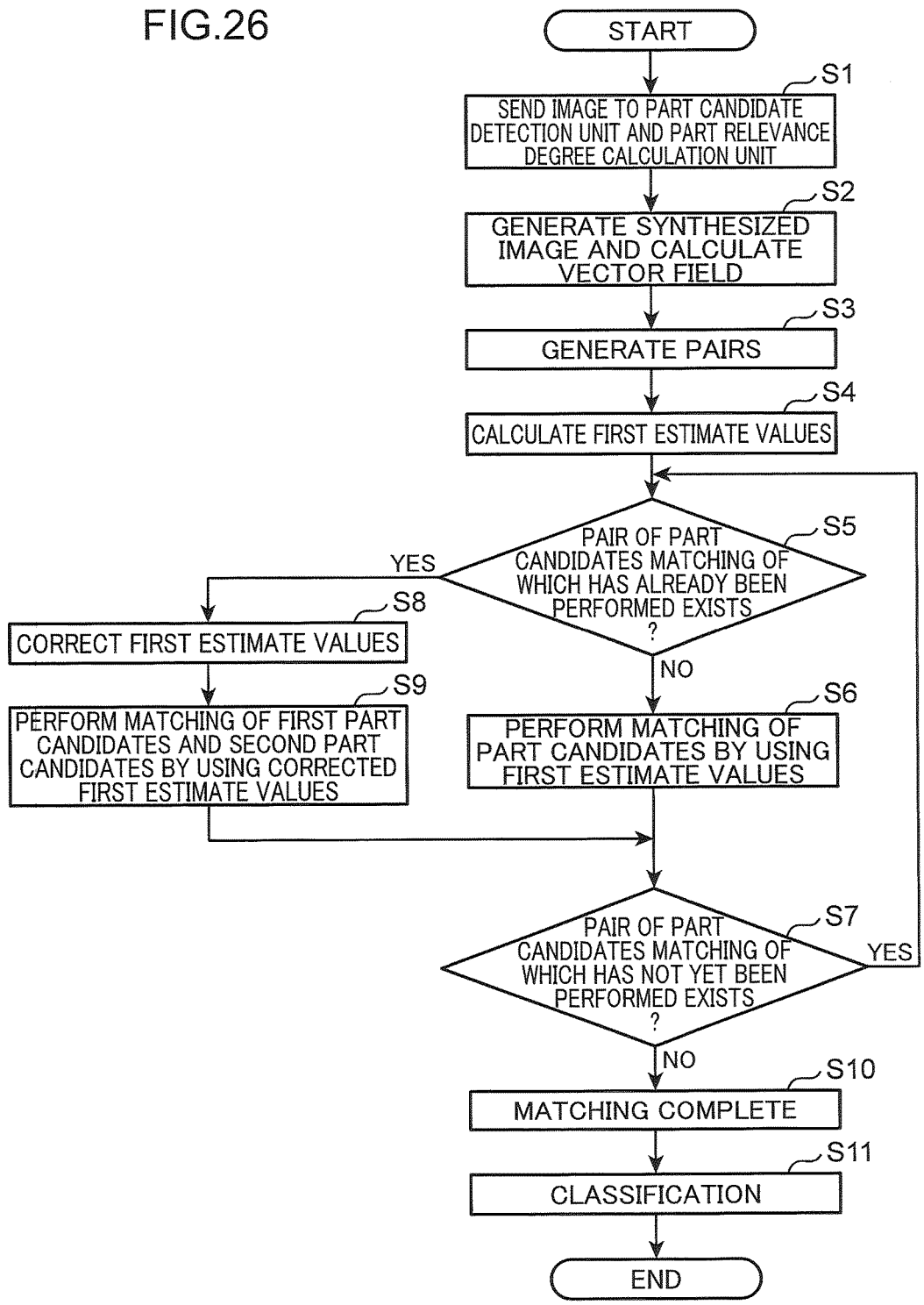
FIG. 26 is a flowchart describing processing in which the image recognition device according to the embodiment performs matching of joint candidates.

Description is provided of the processing in which the image recognition device 100 according to the embodiment performs matching of joint candidates. FIG. 26 is a flowchart describing this processing. Referring to FIG. 1 and FIG. 26, a user operates the input part 40 and thereby selects the image 10 illustrated in FIG. 2 and inputs a command for performing matching of joint candidates. Accordingly, the control processing unit 31 reads out the image 10 stored in the image storage unit 321 and sends the image 10 to the part candidate detection unit 33 and the part relevance degree calculation unit 34 (step S1).

With respect to the image 10 sent thereto, the part candidate detection unit 33 and the part relevance degree calculation unit 34 perform processing in parallel. The part candidate detection unit 33 generates the synthesized image 11 (FIG. 4) based on the image 10 sent thereto, and the part relevance degree calculation unit 34 calculates a vector field based on the image 10 sent thereto (step S2). A specific example of a part 70 of the vector field is illustrated in FIG. 5.

As a precondition for the generation of the synthesized image 11, the part candidate detection unit 33 detects, from the image 10, the plurality of neck joint candidates 1, the plurality of left shoulder joint candidates 2, the plurality of left elbow joint candidates 3, and the plurality of left wrist joint candidates 4, which are illustrated in FIG. 4.

The pair generation unit 35 generates pairs of joint candidates (part candidates) by using these detected joint candidates and the connection information 60 stored in the connection information storage unit 322 (step S3). As described above, the pair generation unit 35 generates nine pairs each including a neck joint candidate 1 and a left shoulder joint candidate 2, nine pairs each including a left shoulder joint candidate 2 and a left elbow joint candidate 3, and nine pairs each including a left elbow joint candidate 3 and a left wrist joint candidate 4 (FIG. 6).

The first estimate value calculation unit 36 calculates a first estimate value for each of these pairs (step S4).

Figure 27:
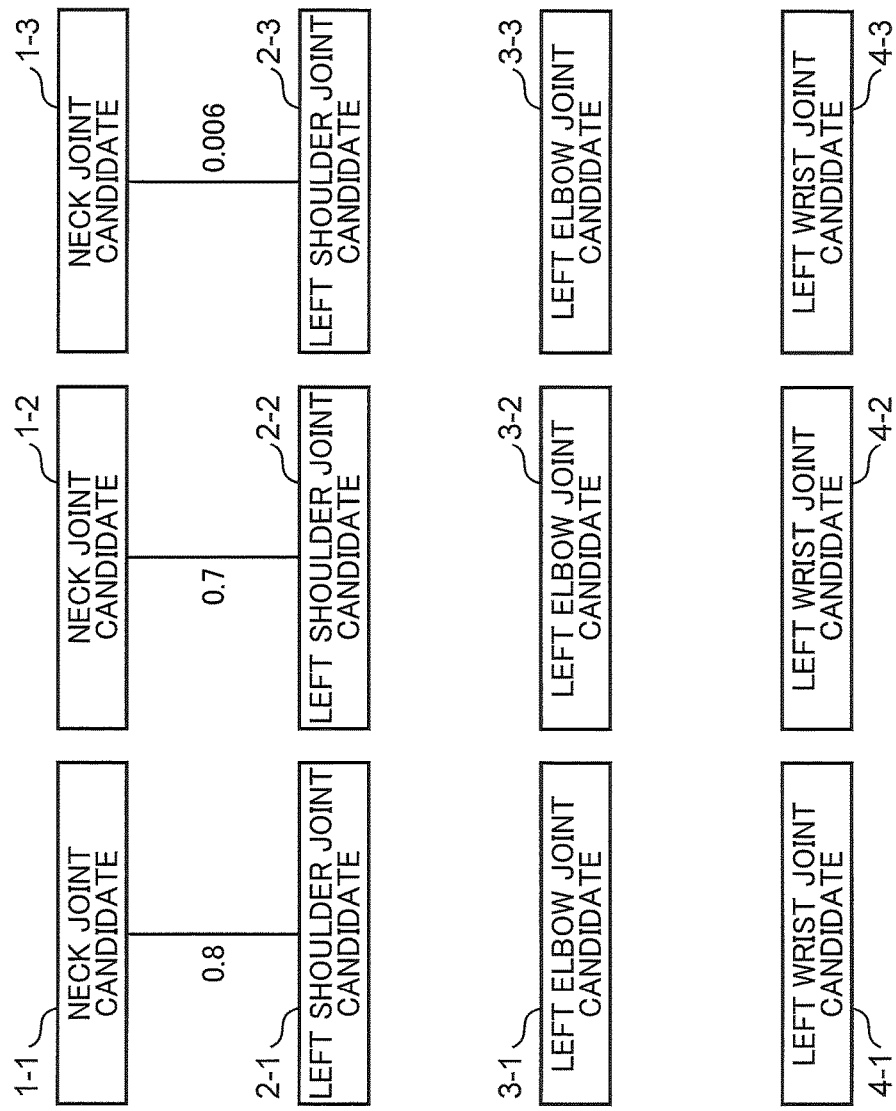
FIG. 27 is an explanatory diagram illustrating a matching result of neck joint candidates and left shoulder joint candidates.

Suppose that matching of the combination of the neck joint candidates 1 and the left shoulder joint candidates 2 is performed first, matching of the combination of the left shoulder joint candidates 2 and the left elbow joint candidates 3 is performed next, and matching of the combination of the left elbow joint candidate 3 and the left wrist joint candidate 4 is performed last. Before performing matching of the neck joint candidates 1 and the left shoulder joint candidates 2, the matching unit 38 determines whether a pair of part candidates (joint candidates) matching of which has already been performed exists (step S5). At this point, there is no pair of part candidates matching of which has already been performed (No in step S5). Accordingly, the matching unit 38 uses the respective first estimate values for the nine pairs of neck joint candidates 1 and left shoulder joint candidates 2 and performs matching of the neck joint candidates 1 (part candidates) and the left shoulder joint candidates 2 (part candidates) (step S6). FIG. 27 is an explanatory diagram illustrating the result of this matching. The neck joint candidate 1-1 and the left shoulder joint candidate 2-1 are connected, the neck joint candidate 1-2 and the left shoulder joint candidate 2-2 are connected, the neck joint candidate 1-3 and the left shoulder joint candidate 2-3 are connected. The numerical values (0.8, 0.7, 0.006) in the drawing are second estimate values.

The matching unit 38 determines whether a pair of part candidates (joint candidates) matching of which has not yet been performed exists (step S7). Matching of the left shoulder joint candidates 2 and the left elbow joint candidates 3 has not yet been performed and matching of the left elbow joint candidates 3 and the left wrist joint candidates 4 has not yet been performed. Therefore, the matching unit 38 determines that there is a pair of part candidates matching of which has not yet been performed (Yes in step S7) and returns to step S5.

Before performing the matching of the left shoulder joint candidates 2 and the left elbow joint candidates 3, the matching unit 38 determines whether a pair of part candidates (joint candidates) matching of which has already been performed exists (step S5). Matching of the neck joint candidates 1 and the left shoulder joint candidates 2 has already been performed. Therefore, the matching unit 38 determines that there is a pair of part candidates (joint candidates) matching of which has already been performed (Yes in step S5) and instructs the first estimate value correction unit 37 to perform correction of first estimate values.

Accordingly, the first estimate value correction unit 37 corrects the respective first estimate values of the nine pairs each including a left shoulder joint candidate 2 and a left elbow joint candidate 3 (step S8). The second estimate values used for correction are the three second estimate values 0.8, 0.7, and 0.006 illustrated in FIG. 27, each of which indicates an estimated possibility that a neck joint candidate 1 and a left shoulder joint candidate 2 are connected.

Figure 28:
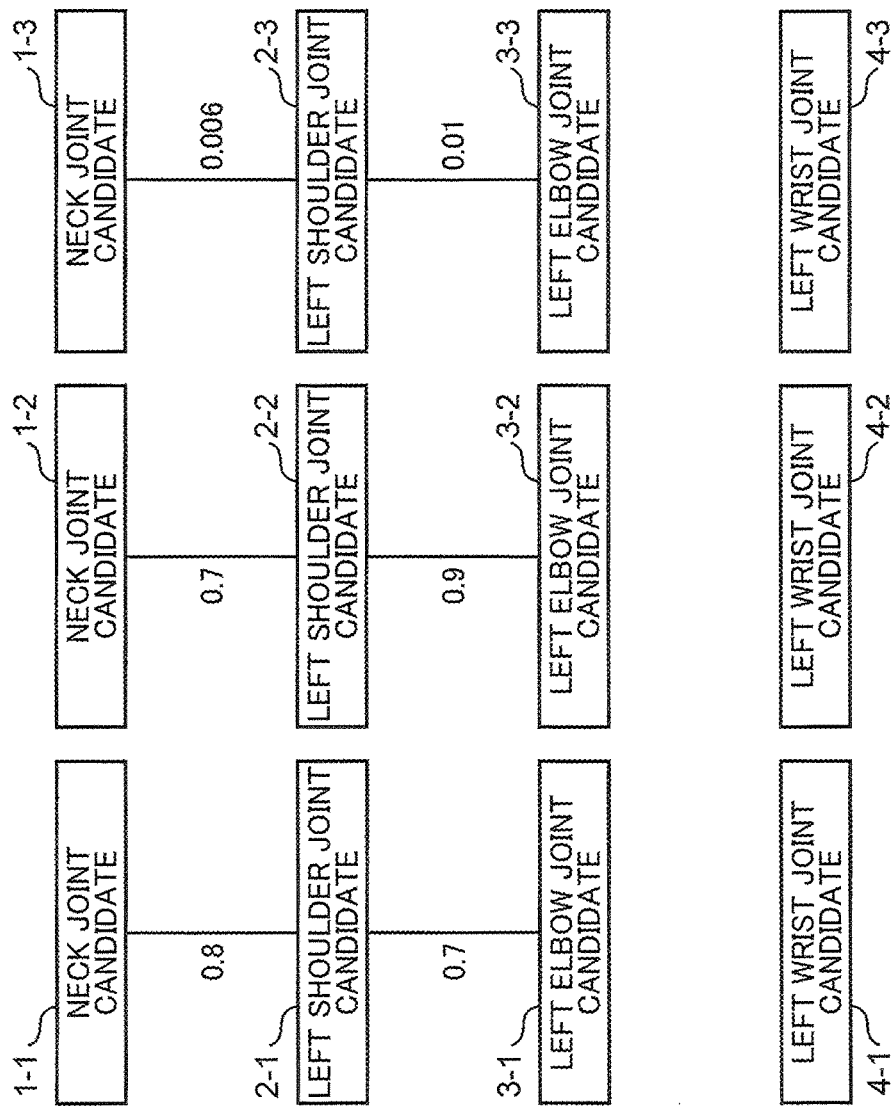
FIG. 28 is an explanatory diagram illustrating a matching result of left shoulder joint candidates and left elbow joint candidates.

The matching unit 38 uses the respective corrected first estimate values for the nine pairs of left shoulder joint candidates 2 and left elbow joint candidates 3 and performs matching of the left shoulder joint candidates 2 (first part candidates) and the left elbow joint candidates 3 (second part candidates) (step S9). FIG. 28 is an explanatory diagram illustrating the result of this matching. The left shoulder joint candidate 2-1 and the left elbow joint candidate 3-1 are connected, the left shoulder joint candidate 2-2 and the left elbow joint candidate 3-2 are connected, and the left shoulder joint candidate 2-3 and the left elbow joint candidate 3-3 are connected. The numerical values (0.8, 0.7, 0.006, 0.7, 0.9, 0.01) in the drawing are second estimate values.

The matching unit 38 determines whether a pair of part candidates (joint candidates) matching of which has not yet been performed exists (step S7). Matching of the left elbow joint candidates 3 and the left wrist joint candidates 4 has not yet been performed. Therefore, the matching unit 38 determines that there is a pair of part candidates matching of which has not yet been performed (Yes in step S7) and returns to step S5.

Before performing the matching of the left elbow joint candidates 3 and the left wrist joint candidates 4, the matching unit 38 determines whether a pair of part candidates (joint candidates) matching of which has already been performed exists (step S5). Matching of the neck joint candidates 1 and the left shoulder joint candidates 2 has already been performed, and matching of the left shoulder joint candidates 2 and the left elbow joint candidates 3 has already been performed (FIG. 28). Therefore, the matching unit 38 determines that there is a pair of part candidates (joint candidates) matching of which has already been performed (Yes in step S5) and instructs the first estimate value correction unit 37 to perform correction of first estimate values.

Accordingly, the first estimate value correction unit 37 corrects the respective first estimate values of the nine pairs each including a left elbow joint candidate 3 and a left wrist joint candidate 4 (step S8). The second estimate values used for correction are the three second estimate values 0.7, 0.9, and 0.01 illustrated in FIG. 28, each of which indicates an estimated possibility that a left shoulder joint candidate 2 and a left elbow joint candidate 3 are connected. Note that the three second estimate values 0.8, 0.7, and 0.006, each of which indicates an estimated possibility that a neck joint candidate 1 and a left shoulder joint candidate 2 are connected, may be used.

Figure 29:
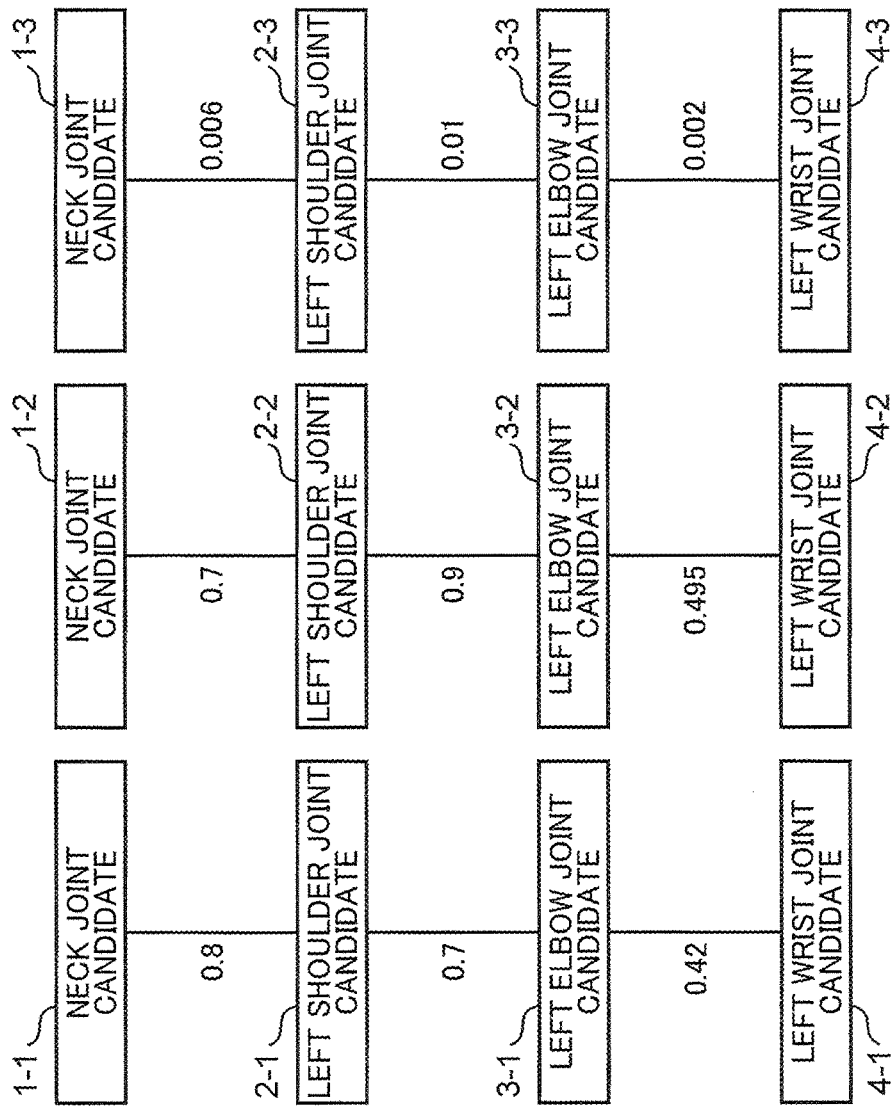
FIG. 29 is an explanatory diagram illustrating a matching result of left elbow joint candidates and left wrist joint candidates.

The matching unit 38 uses the respective corrected first estimate values for the nine pairs of left elbow joint candidates 3 and left wrist joint candidates 4 and performs matching of the left elbow joint candidates 3 (first part candidates) and the left wrist joint candidates 4 (second part candidates) (step S9). FIG. 29 is an explanatory diagram illustrating the result of this matching. The left elbow joint candidate 3-1 and the left wrist joint candidate 4-1 are connected, the left elbow joint candidate 3-2 and the left wrist joint candidate 4-2 are connected, and the left elbow joint candidate 3-3 and the left wrist joint candidate 4-3 are connected. The numerical values (0.8, 0.7, 0.006, 0.7, 0.9, 0.01, 0.42, 0.495, 0.002) in the drawing are second estimate values.

The matching unit 38 determines whether a pair of part candidates (joint candidates) matching of which has not yet been performed exists (step S7). There is no pair of part candidates (joint candidates) matching of which has not yet been performed. Therefore, the matching unit 38 determines that there is no pair of part candidates matching of which has not yet been performed (No in step S7) and concludes the matching (step S10). Referring to FIG. 29, as a result of the matching, the neck joint candidate 1-1, the left shoulder joint candidate 2-1, the left elbow joint candidate 3-1, and the left wrist joint candidate 4-1 are connected in one (four joint candidates that are connected in one), the neck joint candidate 1-2, the left shoulder joint candidate 2-2, the left elbow joint candidate 3-2, and the left wrist joint candidate 4-2 are connected in one (four joint candidates connected in one), and the neck joint candidate 1-3, the left shoulder joint candidate 2-3, the left elbow joint candidate 3-3, and the left wrist joint candidate 4-3 are connected in one (four joint candidates connected in one). Three sets of four joint candidates connected in one have been made.

The control processing unit 31 (storage processing unit) performs classification of the four joint candidates connected in one (step S11). Specifically, the control processing unit 31 classifies the four joint candidates connected in one (the neck joint candidate 1-1, the left shoulder joint candidate 2-1, the left elbow joint candidate 3-1, and the left wrist joint candidate 4-1) as four joint candidates that one person has, classifies the four joint candidates connected in one (the neck joint candidate 1-2, the left shoulder joint candidate 2-2, the left elbow joint candidate 3-2, and the left wrist joint candidate 4-2) as four joint candidates that one person has, and classifies the four joint candidates connected in one (the neck joint candidate 1-3, the left shoulder joint candidate 2-3, the left elbow joint candidate 3-3, and the left wrist joint candidate 4-3) as four joint candidates that one person has, and performs storing thereof to the matching result storage unit 323. Note that the control processing unit 31 (storage processing unit) may perform summing of second estimate values for four joint candidates connected in one and, when the sum is equal to or less than a predetermined threshold value, may regard that the four joint candidates are extraneous to people and exclude the four joint candidates from the target of classification. In the case illustrated in FIG. 29, four joint candidates connected in one (the neck joint candidate 1-3, the left shoulder joint candidate 2-3, the left elbow joint candidate 3-3, and the left wrist joint candidate 4-3) would be excluded from the target of classification.

Hence, for each of a plurality of objects, the control processing unit 31 (storage processing unit) executes processing of storing, to the matching result storage unit 323 (second storage unit), a plurality of part candidates having been connected in one as a result of the matching as the plurality of parts that one object has.

The four joint candidates connected in one as a result of the matching indicate four joints (the neck joint, the left shoulder joint, the left elbow joint, and the left wrist joint) that one person has and can be used for posture estimation of this person's left arm. According to the embodiment, for each of the plurality of people captured in the image 10, four joint candidates connected in one are stored in the matching result storage unit 323. Accordingly, the four joint candidates connected in one can be used for posture estimation of the left arm of each of the plurality of people captured in the image 10.

Figure 30:
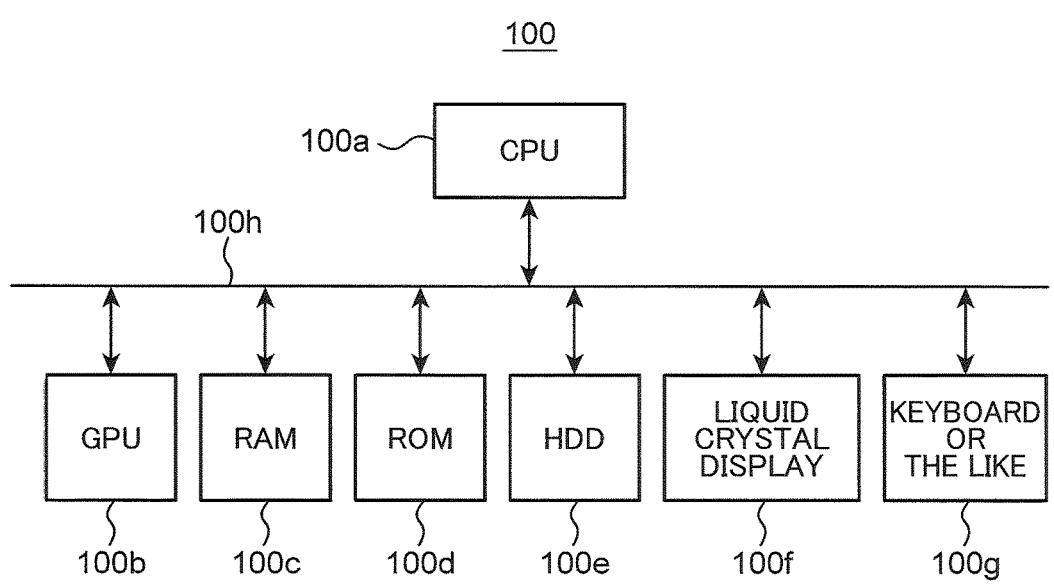
FIG. 30 is a block diagram illustrating a hardware configuration of the image recognition device illustrated in FIG. 1.

FIG. 30 is a block diagram showing a hardware configuration of the image recognition device 100 illustrated in FIG. 1. The image recognition device 100 includes: a central processing unit (CPU) 100a; a graphics processing unit (GPU) 100b; a random access memory (RAM) 100c; a read-only memory (ROM) 100d; a hard disk drive (HDD) 100e; a liquid crystal display 100f; a keyboard or the like 100g; and a bus 100h connecting such components.

Referring to FIG. 1 and FIG. 30, the liquid crystal display 100f is the hardware realizing the output part 50. An organic EL display (organic light-emitting diode display), a plasma display, or the like may be used in place of the liquid crystal display 100f. The keyboard or the like 100g is the hardware realizing the input part 40. A touch panel may be used in place of a keyboard.

The HDD 100e is the hardware realizing the storage unit 32. For the control processing unit 31, the part candidate detection unit 33, the part relevance degree calculation unit 34, the pair generation unit 35, the first estimate value calculation unit 36, the first estimate value correction unit 37, and the matching unit 38, programs for realizing these functional blocks are stored in the HDD 100e. These programs are referred to by using the definitions of the functional blocks. Description is provided taking the part candidate detection unit 33 and a part candidate detection program as an example. The part candidate detection unit 33 executes, for each of a plurality of parts (e.g., joints), processing of detecting a plurality of part candidates serving as candidates of the part from an image in which a plurality of objects (e.g., people) having the plurality of parts are captured. The part candidate detection program is a program that executes, for each of a plurality of parts (e.g., joints), processing of detecting a plurality of part candidates serving as candidates of the part from an image in which a plurality of objects (e.g., people) having the plurality of parts are captured.

These programs are stored in advance to the HDD 100e, but the present invention is not limited to this. For example, a recording medium (e.g., an external recording medium such as a magnetic disk or an optical disk) having these programs recorded thereon may be prepared, and the programs stored on the recording medium may be stored to the HDD 100e. Alternatively, these programs may be stored in a server that is connected to the image recognition device 100 via a network and may be transmitted to the HDD 100e via the network and stored to the HDD 100e. These programs may be stored in the ROM 100d instead of the HDD 100e. The image recognition device 100 may include a flash memory in place of the HDD 100e, and these programs may be stored in the flash memory.

The CPU 100a reads out these programs from the HDD 100e, decompresses the programs in the RAM 100c, and executes the decompressed programs, whereby the control processing unit 31, the part candidate detection unit 33, the part relevance degree calculation unit 34, the pair generation unit 35, the first estimate value calculation unit 36, the first estimate value correction unit 37, and the matching unit 38 are realized. However, with regard to these functions, a part or all of each function may be realized by processing by a digital signal processor (DSP) instead of or in addition to the processing by the CPU 100a. Likewise, a part or all of each function may be realized by processing by a dedicated hardware circuit instead of or in combination with processing by software.

The flowchart in FIG. 26 is a flowchart of these programs (the part candidate detection program, etc.) executed by the CPU 100a.

The GPU 100b executes various types of processing (e.g., image processing) necessary for deep learning (e.g., CNN) under the control of the CPU 100a, for example.

Although the embodiment has been described taking as an example a case in which matching is performed of joint candidates of each of a plurality of people, the present invention is not limited to this. The present invention is also applicable to matching of joint candidates of each of a plurality of humanoid robots and to matching of joint candidates of each of a plurality of animals. Further, the present invention is applicable not only to the matching of joint candidates but also to matching of face parts (the eyes, the nose, the mouth, and the ears) in the recognition of each of a plurality of faces.

Summary of Embodiment

An image recognition device according to a first aspect of the embodiment includes: a detection unit that executes, for each of a plurality of parts, processing of detecting a plurality of part candidates serving as candidates of the part from an image in which a plurality of objects having the plurality of parts are captured; a generation unit that, for a first part candidate and a second part candidate that are the one and the other of the part candidates with respect to which matching is to be performed, combines a plurality of the first part candidates and a plurality of the second part candidates to generate a plurality of pairs each including the first part candidate and the second part candidate; a first calculation unit that calculates a first estimate value for each of the plurality of pairs, the first estimate value indicating an estimated possibility that the first part candidate and the second part candidate are connected; a correction unit that executes, for each of the plurality of pairs, processing of correcting the first estimate value by using a second estimate value as a weight when a part candidate that is one among a pair of part candidates matching of which has already been performed and that differs from both the first part candidate and the second part candidate is connected to either the first part candidate or the second part candidate, the second estimate value indicating an estimated possibility that the pair of part candidates matching of which has already been performed are connected; and a matching unit that performs matching of the plurality of first part candidates and the plurality of second part candidates based on the corrected first estimate values for the respective ones of the plurality of pairs.

The objects are, for example, people, humanoid robots, animals, and faces. The parts are joints in the case of posture recognition and are face parts (the eyes, the nose, the mouth, and the ears) in the case of facial recognition.

For example, likelihood or probability may be used as the first and second estimate values.

The second estimate value is a value indicating an estimated possibility that a pair of part candidates matching of which has already been performed are connected. To provide detailed description, suppose that a left elbow joint candidate is a first part candidate and a left wrist joint candidate is a second part candidate, a left shoulder joint candidate and the left elbow joint candidate are a pair of part candidates matching of which has already been performed, and the left shoulder joint candidate is one among the pair of part candidates. In this case, the left shoulder joint candidate (one among the pair of part candidates) differs from both the left elbow joint candidate (first part candidate) and the left wrist joint candidate (the second part candidate), and is connected to the left elbow joint candidate (first part candidate). The value indicating the estimated possibility that the left shoulder joint candidate and the left elbow joint candidate are connected is the second estimate value.

The correction unit corrects the first estimate value by using the second estimate value as a weight. For example, the correction unit may set a value yielded by multiplying the first estimate value and second estimate value as the corrected first estimate value or may set a value yielded by adding the first estimate value and the second estimate value as the corrected first estimate value.

The detected part candidates may include parts (for example, the mouth part of a glove for the left hand and one corner part of a top board of a desk) that are extraneous to the parts to be detected (for example, joints). The relevance of an extraneous part with respect to a part to be detected is weak, and thus, the first estimate value for a pair of a part candidate indicating an extraneous part and a part candidate indicating a part to be detected is normally low. However, there are cases in which the first estimate value for such a pair becomes a large value due to coincidence. For example, suppose that with respect to a glove for the left hand placed on a desk, one corner part of the top board of the desk is detected as a left elbow joint candidate and the mouth part of the glove is detected as a left wrist joint candidate, and also, the left elbow joint of a person standing near the desk is detected as a left elbow joint candidate and the left wrist joint of the person is detected as a left wrist joint candidate. In this case, for example, there are cases when the first estimate value for the pair of the left elbow joint candidate indicating the left elbow joint of the person standing near the desk and the left wrist joint candidate indicating the mouth part of the glove for the left hand takes a large value due to coincidence. Therefore, when matching of part candidates is performed by using first estimate values, there are cases in which a part candidate indicating an extraneous part and a part candidate indicating a joint are connected.

Since the relevance of extraneous parts with respect to one another is weak, a second estimate value indicating an estimated possibility that a pair of extraneous parts matching of which has already been performed are connected is normally small or extremely small. Therefore, even if a first estimate value for a pair of a part to be detected and an extraneous part is large, the first estimate value after correction using a second estimate value as a weight becomes small or extremely small. Therefore, when matching of part candidates is performed by using corrected first estimate values, it is possible to prevent a situation in which a part candidate indicating an extraneous part and a part candidate indicating a part to be detected are connected. As described up to this point, according to the image recognition device according to the first aspect of the embodiment, the matching accuracy of part candidates detected from an image in which a plurality of objects are captured can be improved.

In the above-described configuration, a first storage unit that stores in advance connection information indicating a connection relationship of the plurality of parts is further included, and the generation unit uses the connection information stored in the first storage to specify, from among the part candidates detected by the hardware processor, part candidates of two types that have a relationship of the first part candidate and the second part candidate.

When taking a case in which the parts are a neck joint, a left shoulder joint, a left elbow joint, and a left wrist joint, the connection information indicates that the neck joint and the left shoulder joint are connected, that the left shoulder joint and the left elbow joint are connected, and that the left elbow joint and the left wrist joint are connected. The neck joint and the left shoulder joint have the relationship of the first part candidate and the second part candidate, the left shoulder joint candidate and the left elbow joint candidate have the relationship of the first part candidate and the second part candidate, and the left elbow joint candidate and the left wrist joint candidate have the relationship of the first part candidate and the second part candidate.

According to this configuration, it is possible to specify, from among the part candidates detected by the detection part, part candidates of two types serving as the first part candidate and the second part candidate.

In the above-described structure, a second storage unit and a storage processing unit that executes, for each of the plurality of objects, processing of storing, to the second storage unit, a plurality of part candidates having been connected in one as a result of the matching as the plurality of parts that the single object has are further included.

A plurality of part candidates connected in one as a result of the matching (for example, a neck joint candidate, a left shoulder joint candidate, a left elbow joint candidate, and a left wrist joint candidate) indicate a plurality of parts that one object has, and for example, can be used for posture estimation of the object. According to this configuration, for each of the plurality of objects captured in an image, a plurality of part candidates connected in one are stored in the second storage unit. Accordingly, the part candidates connected in one can be used for posture estimation of each of the plurality of objects captured in the image.

An image recognition method according to a second aspect of the embodiment includes: a detection step that executes, for each of a plurality of parts, processing of detecting a plurality of part candidates serving as candidates of the part from an image in which a plurality of objects having the plurality of parts are captured; a generation step that, for a first part candidate and a second part candidate that are the one and the other of the part candidates with respect to which matching is to be performed, combines a plurality of the first part candidates and a plurality of the second part candidates to generate a plurality of pairs each including the first part candidate and the second part candidate; a first calculation step that calculates a first estimate value for each of the plurality of pairs, the first estimate value indicating an estimated possibility that the first part candidate and the second part candidate are connected; a correction step that executes, for each of the plurality of pairs, processing of correcting the first estimate value by using a second estimate value as a weight when a part candidate that is one among a pair of part candidates matching of which has already been performed and that differs from both the first part candidate and the second part candidate is connected to either the first part candidate or the second part candidate, the second estimate value indicating an estimated possibility that the pair of part candidates matching of which has already been performed are connected; and a matching step that performs matching of the plurality of first part candidates and the plurality of second part candidates based on the corrected first estimate values for the respective ones of the plurality of pairs.

The image recognition method according to the second aspect of the embodiment defines the image recognition device according to the first aspect of the embodiment from the viewpoint of a method and has the same effects as the image recognition device according to the first aspect of the embodiment.

An image recognition program according to a third aspect of the embodiment causes a computer to execute: a detection step that executes, for each of a plurality of parts, processing of detecting a plurality of part candidates serving as candidates of the part from an image in which a plurality of objects having the plurality of parts are captured; a generation step that, for a first part candidate and a second part candidate that are the one and the other of the part candidates with respect to which matching is to be performed, combines a plurality of the first part candidates and a plurality of the second part candidates to generate a plurality of pairs each including the first part candidate and the second part candidate; a first calculation step that calculates a first estimate value for each of the plurality of pairs, the first estimate value indicating an estimated possibility that the first part candidate and the second part candidate are connected; a correction step that executes, for each of the plurality of pairs, processing of correcting the first estimate value by using a second estimate value as a weight when a part candidate that is one among a pair of part candidates matching of which has already been performed and that differs from both the first part candidate and the second part candidate is connected to either the first part candidate or the second part candidate, the second estimate value indicating an estimated possibility that the pair of part candidates matching of which has already been performed are connected; and a matching step that performs matching of the plurality of first part candidates and the plurality of second part candidates based on the corrected first estimate values for the respective ones of the plurality of pairs.

The image recognition program according to the third aspect of the embodiment defines the image recognition device according to the first aspect of the embodiment from the viewpoint of a program and has the same effects as the image recognition device according to the first aspect of the embodiment.

Although an embodiment of the present invention has been illustrated and described in detail, the illustrations and description are merely example illustrations and an actual example and are not limiting. The scope of the present invention should be construed according to the recitations of the claims appended hereto.

The entirety of the disclosure of Japanese Patent Application No. 2018-13933 filed on Jan. 30, 2018 is hereby incorporated by reference in its entirety.

The invention claimed is:

1. An image recognition device comprising a hardware processor, wherein the hardware processor:
executes, for each of a plurality of parts, processing of detecting a plurality of part candidates serving as candidates of the part from an image in which a plurality of objects having the plurality of parts are captured;
for a first part candidate and a second part candidate that are the one and the other of the part candidates with respect to which matching is to be performed, combines a plurality of the first part candidates and a plurality of the second part candidates to generate a plurality of pairs each including the first part candidate and the second part candidate;
calculates a first estimate value for each of the plurality of pairs, the first estimate value indicating an estimated possibility that the first part candidate and the second part candidate are connected;
executes, for each of the plurality of pairs, processing of correcting the first estimate value by using a second estimate value as a weight when a part candidate that is one among a pair of part candidates matching of which has already been performed and that differs from both the first part candidate and the second part candidate is connected to either the first part candidate or the second part candidate, the second estimate value indicating an estimated possibility that the pair of part candidates matching of which has already been performed are connected; and
performs matching of the plurality of first part candidates and the plurality of second part candidates based on the corrected first estimate values for the respective ones of the plurality of pairs;
wherein the hardware processor sets a value yielded by multiplying the first estimate value and the second estimate value as the corrected first estimate value.

2. The image recognition device according to claim 1 further comprising
a first storage that stores in advance connection information indicating a connection relationship of the plurality of parts,
wherein the hardware processor uses the connection information stored in the first storage to specify, from among the part candidates detected by the hardware processor, part candidates of two types that have a relationship of the first part candidate and the second part candidate.

3. The image recognition device according to claim 1 further comprising
a second storage,
wherein, for each of the plurality of objects, the hardware processor executes processing of storing, to the second storage, a plurality of part candidates having been connected in one as a result of the matching as the plurality of parts that the single object has.

4. An image recognition method that:
executes, for each of a plurality of parts, processing of detecting a plurality of part candidates serving as candidates of the part from an image in which a plurality of objects having the plurality of parts are captured;
for a first part candidate and a second part candidate that are the one and the other of the part candidates with respect to which matching is to be performed, combines a plurality of the first part candidates and a plurality of the second part candidates to generate a plurality of pairs each including the first part candidate and the second part candidate;

calculates a first estimate value for each of the plurality of pairs, the first estimate value indicating an estimated possibility that the first part candidate and the second part candidate are connected;

executes, for each of the plurality of pairs, processing of correcting the first estimate value by using a second estimate value as a weight when a part candidate that is one among a pair of part candidates matching of which has already been performed and that differs from both the first part candidate and the second part candidate is connected to either the first part candidate or the second part candidate, the second estimate value indicating an estimated possibility that the pair of part candidates matching of which has already been performed are connected; and performs matching of the plurality of first part candidates and the plurality of second part candidates based on the corrected first estimate values for the respective ones of the plurality of pairs;

wherein the hardware processor sets a value yielded by multiplying the first estimate value and the second estimate value as the corrected first estimate value.

5. A computer-readable recording medium having recorded thereon an image recognition program that causes a computer to:

execute, for each of a plurality of parts, processing of detecting a plurality of part candidates serving as candidates of the part from an image in which a plurality of objects having the plurality of parts are captured;

for a first part candidate and a second part candidate that are the one and the other of the part candidates with respect to which matching is to be performed, combine a plurality of the first part candidates and a plurality of the second part candidates to generate a plurality of pairs each including the first part candidate and the second part candidate;

calculate a first estimate value for each of the plurality of pairs, the first estimate value indicating an estimated possibility that the first part candidate and the second part candidate are connected;

execute, for each of the plurality of pairs, processing of correcting the first estimate value by using a second estimate value as a weight when a part candidate that is one among a pair of part candidates matching of which has already been performed and that differs from both the first part candidate and the second part candidate is connected to either the first part candidate or the second part candidate, the second estimate value indicating an estimated possibility that the pair of part candidates matching of which has already been performed are connected; and perform matching of the plurality of first part candidates and the plurality of second part candidates based on the corrected first estimate values for the respective ones of the plurality of pairs;

wherein the hardware processor sets a value yielded by multiplying the first estimate value and the second estimate value as the corrected first estimate value.

* * * * *